(12) United States Patent
Andrews et al.

(10) Patent No.: US 7,018,751 B2
(45) Date of Patent: Mar. 28, 2006

(54) RADIATION FILTER ELEMENT AND MANUFACTURING PROCESSES THEREFORE

(75) Inventors: Gerald D. Andrews, Hockessin, DE (US); Jonathan V. Caspar, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 53 days.

(21) Appl. No.: 10/510,805

(22) PCT Filed: May 15, 2003

(86) PCT No.: PCT/US03/16536

§ 371 (c)(1), (2), (4) Date: Oct. 6, 2004

(87) PCT Pub. No.: WO03/098351

PCT Pub. Date: Nov. 27, 2003

(65) Prior Publication Data

US 2005/0214659 A1    Sep. 29, 2005

Related U.S. Application Data

(60) Provisional application No. 60/440,525, filed on Jan. 16, 2003, provisional application No. 60/381,289, filed on May 17, 2002.

(51) Int. Cl.
*G02F 1/1335* (2006.01)
*G02F 7/34* (2006.01)

(52) U.S. Cl. ............................ 430/7; 430/200; 430/330; 430/944; 349/106

(58) Field of Classification Search ...................... None
See application file for complete search history.

(56) References Cited

U.S. PATENT DOCUMENTS

| | | |
|---|---|---|
| 3,495,987 A | 2/1970 | Moore |
| 4,315,983 A | 2/1982 | Kawamura et al. |
| 4,446,223 A | 5/1984 | Wadsworth et al. |
| 4,508,811 A | 4/1985 | Gravesteijn et al. |
| 4,675,357 A | 6/1987 | Welch |
| 4,680,352 A | 7/1987 | Janowicz et al. |
| 4,722,984 A | 2/1988 | Janowicz |
| 4,767,571 A | 8/1988 | Suzuki et al. |
| 4,778,128 A | 10/1988 | Wright et al. |
| 4,791,023 A | 12/1988 | Suzuki et al. |
| 4,892,584 A | 1/1990 | Chapman |
| 4,912,083 A | 3/1990 | Chapman et al. |
| 4,913,846 A | 4/1990 | Suzuki et al. |
| 4,921,317 A | 5/1990 | Suzuki et al. |
| 4,923,638 A | 5/1990 | Ohno et al. |
| 4,942,141 A | 7/1990 | DeBoer et al. |
| 4,948,776 A | 8/1990 | Evans et al. |
| 4,948,777 A | 8/1990 | Evans et al. |
| 4,948,778 A | 8/1990 | DeBoer |
| 4,950,639 A | 8/1990 | DeBoer et al. |
| 4,950,640 A | 8/1990 | Evans et al. |
| 4,952,552 A | 8/1990 | Chapman et al. |
| 4,973,572 A | 11/1990 | DeBoer |
| 5,019,480 A | 5/1991 | DeBoer et al. |
| 5,019,549 A | 5/1991 | Kellogg et al. |
| 5,024,923 A | 6/1991 | Suzuki et al. |
| 5,034,303 A | 7/1991 | Evans et al. |
| 5,035,977 A | 7/1991 | DeBoer et al. |
| 5,036,040 A | 7/1991 | Chapman et al. |
| 5,108,873 A | 4/1992 | Fukui et al. |
| 5,156,938 A | 10/1992 | Foley et al. |

(Continued)

FOREIGN PATENT DOCUMENTS

EP    0 249 614 B1    12/1987

(Continued)

OTHER PUBLICATIONS

Paint & Surface Coatings: Theory and Practice, Edited by R. Lombourne, Ellis Horwood Ltd., West Sussex, England, 1987, pp. 296-299.

(Continued)

*Primary Examiner*—John A. McPherson
(74) *Attorney, Agent, or Firm*—Thomas H. Magee

(57) ABSTRACT

A process for making a radiation filter element comprises the steps of: exposing part of an assemblage to infrared radiation, the assemblage comprising a donor comprising (1) a support capable of transmitting infrared light, and (2) a transferable layer comprising a transferable material and an infrared-absorbing dye, the transferable layer of the donor being in contact with a receiver to provide an exposed assemblage comprising an exposed part of the transferable layer and an unexposed part of the transferable layer; separating the receiver and the support of the exposed assemblage to obtain an imaged receiver and a spent donor, wherein the imaged receiver comprises the receiver, a transferred portion of the transferable material and a transferred portion of the infrared-absorbing dye, said transferred portion of the IR dye having a color and the spent donor comprises the support and a retained portion of the transferable layer; and heating the transferred portion of the transferable material and the transferred portion of the infrared-absorbing dye at a temperature ranging from about 100 degrees Celsius to about 350 degrees Celsius for a period of time sufficient to thermally decolorize 50% to 100% of the transferred portion of the infrared-absorbing dye, the heating being in the absence of a thermal bleaching agent to provide a radiation filter element suitable for use in a liquid crystal display. Preferably color filter elements of this invention are used in liquid crystal display devices.

6 Claims, No Drawings

U.S. PATENT DOCUMENTS

| | | | |
|---|---|---|---|
| 5,171,650 A | 12/1992 | Ellis et al. | |
| 5,219,703 A * | 6/1993 | Bugner et al. | 430/200 |
| 5,256,506 A | 10/1993 | Ellis et al. | |
| 5,334,573 A | 8/1994 | Schild | |
| 5,362,826 A | 11/1994 | Berge et al. | |
| 5,427,847 A | 6/1995 | Zawada | |
| 5,521,035 A * | 5/1996 | Wolk et al. | 430/20 |
| 5,593,808 A | 1/1997 | Ellis | |
| 5,622,795 A | 4/1997 | Ellis | |
| 5,681,681 A | 10/1997 | Ellis | |
| 5,773,188 A | 6/1998 | Ellis | |
| 5,773,534 A | 6/1998 | Antonelli et al. | |
| 5,945,249 A * | 8/1999 | Patel et al. | 430/200 |
| 6,171,766 B1 | 1/2001 | Patel et al. | |

FOREIGN PATENT DOCUMENTS

| | | |
|---|---|---|
| EP | 0 675 003 * | 10/1995 |
| EP | 0 675 003 A1 | 10/1995 |

OTHER PUBLICATIONS

The Application of Laser Light Scattering to the Study of Biological Motion, Edited by J.C. Earnshaw and M.W. Steer, Plenum Press, NY, 1983, pp. 53-76.

* cited by examiner

RADIATION FILTER ELEMENT AND MANUFACTURING PROCESSES THEREFORE

CROSS-REFERENCE TO RELATED APPLICATIONS

This application claims the benefit under 35 U.S.C. 119(e) of U.S. Provisional Application 60/440,525 filed on Jan. 16, 2003 and U.S. Provisional Application 60/381,289 filed on May 17, 2002 which are incorporated herein by reference in their entireties.

BACKGROUND OF THE INVENTION

This invention relates to a monochrome or color filter array element. More particularly this invention relates to display devices incorporating the monochrome or color filter array element such as liquid crystal displays.

Thermal transfer processes that selectively impinge radiation on a layer to transfer a material such as a colorant to a receiver are known. Lasers are useful sources of such radiation, particularly infrared lasers, which are readily available, easily used, and powerful. Thermal transfer processes are imaging processes used in applications such as color proofing, electronic circuit manufacture, monochrome and color filters, and lithography.

Monochrome and color filters are useful for liquid crystal display devices such as flat panel display devices. Liquid crystal display devices are known for digital display in electronic calculators, clocks, household appliances, audio and visual equipment, etc.

Radiation filters, monochrome filters, color filters, flat panel displays and liquid crystal displays are described in "Fundamentals of Active-Matrix Liquid-Crystal Displays", Sang Soo Kim, Society for Information Display Short Course, 2001, and in a series of publications from the Materials Research Society, located in Warrendale, Pa. (e.g. volume 345, titled "Flat Panel Display Materials", edited by J. Batey, A. Chiang, and P. H. Holloway, ISBN 1-55899-245-6; volume 424, titled "Flat-Panel Display Materials II", edited by Miltiadis K. Hatalis, Jerzy Kanicki, Christopher J. Summers, and Fumiaki Funada, ISBN1-55899-327-4; volume 471, titled "Flat Panel Display Materials III", edited by R. Fulks, G. Parsons, D. Slobodin, and T. Yuzuriha, ISBN 1-55899-375-4; and volume 508, titled "Flat-Panel Display Materials 1998", edited by G. Parsons, T. S. Fahlen, S. Morozumi, C. Seager, and C-C. Tsai, ISBN 1-55899-414-9).

Certain thermal transfer processes are known. These known processes include dye sublimation, dye transfer, melt transfer, and ablative material transfer. These processes typically use an assemblage comprising (a) a donor that contains a transferable layer with a material to be transferred (for example a colorant such as a dye or a pigment) and a support for the transferable layer, and (b) a receiver, the receiver having a receiving surface closely aligned and in at least partial contact with the material to be transferred. The assemblage is imagewise exposed by radiation, typically infrared radiation from an infrared laser scanning over portions of the assemblage directed towards selected regions of transferable material, resulting in a selective transfer of the selected regions of material from the transferable layer of the donor to the receiver, on or through its receiving surface. Typically a mask is not necessary since only a small part is irradiated at a time. Each imagewise-controlled exposure typically takes place in a small, selected part of the assemblage at one time, so that the transfer of the material from the imageable element to the receiver element can be built up one region at a time. Exposure can be continuous or intermittent over the total time and area necessary. When exposure is complete, the built-up regions from the exposed parts can be contiguous or separate. Computer control can accomplish the exposure and transfer with high resolution and at high speed. The assemblage, after the imagewise exposure to the radiation from the laser as described supra, is henceforth termed an exposed assemblage.

The exposed assemblage can be separated into two elements, a spent donor retaining material from unexposed regions and the support, and an imaged receiver containing the receiver and the transferred material from exposed regions. Transfer of material to the receiver by exposure need not be complete and total over the exposed regions after separation in order to be useful; some material from exposed regions may be retained on the spent donor. Retention of material in the unexposed regions on the spent donor need not be complete in order to be useful; some may be transferred to the imaged receiver. However, differentiation of the amount of material transferred between exposed and unexposed regions is necessary. Nearly complete transfer by exposure and nearly complete retention without exposure is typical for mass transfer methods. Incomplete transfer by exposure is typically achieved with dye sublimation methods.

In laser induced thermal imaging processes, radiation absorbers are typically a component of the donor, so as to effectively convert the scanned radiation into heat, which initiates the thermal process responsible for transfer. Examples of radiation absorbers are thin metal layers, radiation-absorbing pigments, and/or radiation-absorbing dyes. Infrared-absorbing dyes are a specific example useful with infrared lasers as the radiation source for thermal imaging. In some cases, a pigment or dye used as a colorant simultaneously serves adequately as a radiation absorber, but in many cases a supplemental radiation absorber is necessary to convert enough of the scanned radiation into heat in order to transfer material.

Although a radiation absorber may be a necessary component of a donor, its use can introduce well-recognized problems. Opaque or colored radiation absorbers may interfere with achieving a desired transparency or color. Radiation absorbers may be transferred inconsistently with different exposure conditions, giving variable results of transparency or color unsuitable for demanding applications. Radiation absorbers of initially low color and opacity can be changed by exposure to give opaque or colored products, possibly changing over a period of time such as hours or days.

The presence of the infrared-absorbing dye among the materials transferred can be an undesirable but inevitable occurrence for many choices of infrared-absorbing dye, transferable material, assemblage, and exposure conditions. Although the infrared-absorbing dye is known to be capable of improving the production of the imaged receiver by absorbing radiation during the exposure step and facilitating an image-wise transfer, the transfer of infrared-absorbing dye during exposure is typically undesired. Infrared-absorbing dye transferred onto the receiver can produce a first problem of undesirably adding color to the receiver. The transferred infrared-absorbing dye may also be less stable than other color contributors such as pigments, producing a second problem of a color change over a period of time. The color contribution and change in color contribution of transferred infrared-absorbing dye can be dependent on many factors such as variable exposure conditions and positioning on the receiver, leading to irreproducibility of color in exposed receivers. However, typically many hundreds or thousands of receivers must be manufactured to meet a specific color specification.

Bleaching agents for thermal transfer processes are known. Certain bleaching agents have been combined with heating or exposure to light, to improve the utility of thermal imaging applications processes, and products by eliminating the presence of the infrared-absorbing dye after the imaging step.

Using a chemical bleaching agent and optionally a processing step such as additional radiation exposure and heating to remove the color contribution of transferred infrared-absorbing dye can be an undesirable solution to the foregoing problems. The introduction of chemical bleaching agents can be a complex process with unintended side-effects, such as physical damage, chemical damage to materials other than the infrared-absorbing dye, regulatory and health concerns, expense, shelf life and distribution channel complexities, and other known concerns.

There is a well-recognized need to improve the utility of radiation absorbers used in thermal transfer processes by minimizing their contributions to color and color variation after exposure. Placing the radiation absorber in a separate layer that is not transferred with colorant can minimize variable amounts of transfer; however, this separation may affect the utility of the radiation absorber. Special radiation absorbers can be provided which decompose upon the heating provided by laser exposure; however such special radiation absorbers may have low shelf life.

Colored radiation absorbers and radiation absorbers that change in color after exposure can be bleached by chemical bleaching agents added to the donor or receiver, or introduced at a later time. The bleaching speed or completeness of chemical bleaching agents may be improved by further exposure to radiation or heating. However, chemical bleaching agents introduced to the donor or receiver can lower the shelf life of the donor, receiver, or assemblage. Introducing chemical bleaching agents after exposure can be inconvenient, expensive, or can physically damage a transferred layer.

There remains a need for improved and simplified thermal imaging processes that can utilize a variety of infrared-absorbing dyes to produce objects of a specific color free of unwanted color attributable to the infrared-absorbing dye color.

BRIEF SUMMARY OF THE INVENTION

A radiation-absorbing dye used in a thermal imaging donor that is imagewise exposed to infrared radiation is further heated to decolorize the dye.

This invention relates to a method for making a radiation filter element, comprising the steps of: exposing part of an assemblage to infrared radiation, the assemblage comprising a donor comprising (1) a support capable of transmitting infrared light, and (2) a transferable layer comprising a transferable material and an infrared-absorbing dye, the transferable layer of the donor being in contact with a receiver to provide an exposed assemblage comprising an exposed part of the transferable layer and an unexposed part of the transferable layer; separating the receiver and the support of the exposed assemblage to obtain an imaged receiver and a spent donor, wherein the imaged receiver comprises the receiver, a transferred portion of the transferable material and a transferred portion of the infrared-absorbing dye, said transferred portion of the IR dye having a color and the spent donor comprises the support and a retained portion of the transferable layer; and heating the transferred portion of the transferable material and the transferred portion of the infrared-absorbing dye at a temperature ranging from about 100 degrees Celsius to about 350 degrees Celsius for a period of time sufficient to thermally decolorize 50% to 100% of the transferred portion of the infrared-absorbing dye, the heating being in the absence of a thermal bleaching agent to provide a radiation filter element suitable for use in a liquid crystal display.

DETAILED DESCRIPTION OF THE INVENTION

Embodiments of the present invention comprise: a thermally-imageable assemblage comprising a donor with a transferable infrared-absorbing dye and a first receiver; an imaging process that causes heating and transfer of an unchanged portion of the infrared-absorbing dye to the first receiver; and heating of the transferred and unchanged portion of the infrared-absorbing dye to thermally decolorize a fraction (greater than 0.5 and less than or equal to 1) of the transferred infrared-absorbing dye.

The invention uses an assemblage of a donor and a receiver suitable for thermal imaging. The donor can be a complex multilayer structure as is known in the art, comprising a support and a material to be transferred. The support may optionally comprise any one or more of: a base layer, a radiation to heat conversion layer; a release layer; an ejection layer; an adhesive layer and other layers of materials as known in the art.

The base layer of the support serves at least two functions: to provide a surface holding other layers, and to transmit a portion of infrared radiation during the exposure step. The base layer may comprise a dimensionally stable, flexible, sheet material. Examples of transparent, flexible films appropriate for use as the base layer include, for example, films of polyesters (such as polyethylene terephthalate), polyether sulfone, polyimides, poly(vinyl alcohol-co-acetal), polyethylenes, or cellulose esters, such as cellulose acetate, and polyvinyl chloride. In one embodiment, the base layer of the donor support is polyethylene terephthalate that has been plasma treated. Other materials can be present as additives in the base layer, as long as they do not interfere with the essential function of the support. Examples of such additives include plasticizers, coating aids, flow additives, slip agents, antihalation agents, antistatic agents, surfactants, and others which are known for use in the formulation of films. The base layer generally has a thickness in the range of 5–200 microns, preferably 38–102 microns.

The radiation to heat conversion layer serves to absorb a portion of radiation used in the exposure step, by converting the energy of the radiation to thermal energy which serves to assist the transfer of material from the donor to the receiver. The radiation to heat conversion layer may comprise a suitable material such as a metal, a metal oxide, an organic layer comprising an organic binder and an infrared absorber, a nonmetal, or mixtures of suitable materials. Some examples of suitable materials are transition metal elements and metallic elements of Groups 13, 14, 15 and 16, their alloys with each other, and their alloys with the elements of Groups 1 and 2. (The IUPAC numbering system is used throughout, where the groups are numbered from left to right as 1–18 as shown in the CRC Handbook of Chemistry and Physics, 81st Edition, 2000.)

Nickel, tungsten, aluminum, chromium and nickel vanadium alloys are typical metals for the radiation to heat conversion layer. Chromium applied by sputtering is the most typical choice for the radiation to heat conversion layer. Metal oxides such as aluminum oxide and chromium oxide are suitable. Carbon, a Group 14, nonmetallic element, may also be used.

The radiation to heat conversion layer can be an organic layer comprising an organic binder and an infrared absorber. Some examples of suitable binders include polyvinyl chloride, chlorinated polyvinyl chloride and nitrocellulose. Examples of infrared absorbers are carbon black and infrared-absorbing dyes. Polymers with higher decomposition temperatures may also be employed in fabricating organic layers useful as radiation to heat conversion layers.

In one embodiment, the thickness of the radiation to heat conversion layer depends on the optical absorption of the metals used. A preferred metallization thickness is such as to give about 25% optical transmission to about 60% optical transmission at a radiation wavelength of 830 nm, with a preferred range of about 50% optical transmission.

Although it is preferred to have a single optional radiation to heat conversion layer, it is also possible to have more than one radiation to heat conversion layer, and the different layers can have the same or different compositions.

The optional radiation to heat conversion layer may be applied to the base layer by a physical vapor deposition technique. The term "physical vapor deposition" refers to various deposition approaches carried out in vacuum. Thus, for example, physical vapor deposition includes all forms of sputtering, including ion beam sputtering, as well as all forms of vapor deposition, such as electron beam evaporation and chemical vapor deposition. A specific form of physical vapor deposition useful in the present invention is RF magnetron sputtering. Nickel may be electron beam deposited onto the base support. Aluminum may be applied by resistive heating. Chromium, nickel and nickel vanadium layers may be applied by either sputtering or electron beam deposition. In the case of optional heating layers comprised of organic layers, the radiation to heat conversion layer may be applied by conventional solvent coating techniques.

The release layer serves to assist the transfer of material from the donor to the receiver by lowering the adhesion of the material to the donor. The release layer may comprise a layer formed by oxygen plasma treatment of the surface of the radiation to heat conversion layer, the base layer, or some other layer. It may comprise a layer derived from treatment of the surface of another support layer by a silylating agent such as hexamethyldisilazane, trichlorosilane perfluorodecane, tridecafluoro-1,1,2,2-tetrahydrooctyl-1-methyldichlorosilane, or other silylating agents. Release layers vary in thickness from about 0.001 microns to about 10 microns.

Adhesive layers serve to improve adhesion between layers of the donor, or most commonly to improve contact between the donor and the receiver.

The ejection layer serves to provide a force that assists in transfer of material from the donor to the receiver. The ejection layer may comprise a polymer that decomposes into gaseous molecules when heated, providing additional force to cause transfer of exposed portions of the transferable material to the receiver object. A polymer having a relatively low decomposition temperature (less than about 350 degrees Celsius, preferably less than about 325 degrees Celsius, and more preferably less than about 280 degrees Celsius) may be used. In the case of polymers having more than one decomposition temperature, the first decomposition temperature should be lower than 350 degrees Celsius. Suitable ejection layer components are polymers selected from the group consisting of substituted polystyrenes, polyacrylate esters, polymethacrylate esters, cellulose acetate butyrate, nitrocellulose, poly (vinyl chloride), chlorinated poly(vinyl chloride), polycarbonates, copolymers thereof, and mixtures thereof. Thermal additives may also be provided in the ejection layer to amplify the effect of the heat generated in the radiation to heat conversion layer. By providing an additional decomposition pathway for the creation of gaseous products, additional propulsive forces can be generated to assist in the transfer process. The ejection layer can be from about 0.01 microns to about 10 microns in thickness.

The support is typically a sheet from about 10 microns to about 200 microns in thickness. In one embodiment, the support is a multilayer polyester film from about 40 microns to about 60 microns in thickness. In one embodiment of the invention, the support comprises as an outermost base layer a blue-dyed polyester terephthalate film about 52 microns in thickness with a radiation to heat conversion layer of chromium of about 1 nanometer in thickness on the polyester terephthalate surface of the base layer on the side that contacts the transferable layer, providing 50 percent transmission of 830 nanometer wavelength radiation through the radiation to heat conversion layer.

In one embodiment, the support is capable of transmitting infrared radiation. Infrared radiation is herein defined as having a wavelength from 740 nanometers to 1500 nanometers. Infrared radiation is transmitted by and through a material when some detectable portion of a beam of infrared radiation passes through the material, even though some other portion of the beam may also be absorbed or scattered by the material. The material does not have to transmit infrared radiation at all possible wavelengths; it is sufficient if at least one wavelength is transmitted. The material does not have to transmit all infrared radiation at a possible wavelength; it is sufficient if at least about 10% of the radiation at one infrared wavelength is transmitted. In one embodiment more than about 80% of 830-nanometer infrared radiation is transmitted through the support. In another embodiment more than about 10% and less than about 90% of 830-nanometer infrared radiation is transmitted through the support, because of the presence of a radiation-absorbing, metal-containing layer in the support.

The support of the donor supports at least one transferable layer comprising a transferable material and a transferable infrared-absorbing dye. Typically the infrared absorbing dye partially and selectively absorbs radiation between 400 nanometers and 1500 nanometers typically due to electronic energy levels within the dye. Preferably the dye has a detectable solubility in a liquid chosen from at least one of water and organic solvents, typically greater than a solubility of about 1 milligram of dye per liter of liquid. The spectral wavelength region from about 400 nanometers to about 740 nanometers is considered the visible region. The spectral wavelength region from about 740 nanometers to about 1500 nanometers is considered the infrared region. Infrared-absorbing dyes have at least one radiation absorption local maximum(s) between 650 nanometers and 1500 nanometers (considering all radiation absorption characteristics between 400 nanometers and 1500 nanometers) and may have significant absorption at other wavelengths. Typically an infrared-absorbing dye is distinguished from other dyes because the median extinction coefficient in at least one wavelength region of 100 nanometers in width in the range of 740 nanometers to 1500 nanometers is greater than the median extinction coefficient over the entire wavelength region from 400 nanometers to 740 nanometers.

Infrared-absorbing dyes are used in some thermal imaging applications to increase the absorbance of infrared radiation in the exposure step and thereby produce a temperature increase in the volume containing the infrared-absorbing dye. After the exposure step using infrared radiation is accomplished, the presence of the infrared-absorbing dye is no longer necessary for the functioning of the thermal imaging process. In many products made by thermal imaging using an infrared-absorbing dye, such as color filters, color proofs, liquid crystal displays, and other colored or monochrome objects, the presence of the infrared-absorbing dye is undesirable due to its color; that is, the spectral absorption characteristics of the dye. The removal of a portion or all of the infrared absorbing dye after the exposure step is desirable, for example removal by thermal decolorization ranging from about 50% to about 100% of the transferred portion of the infrared-absorbing dye is preferred.

Examples of suitable infrared-absorbing dyes that can be used alone or in combination in the present invention include polysubstituted phthalocyanine compounds and metal-containing phthalocyanine compounds; metal-complex dyes, benzoxazole dyes, benz[e,f, or g]indolium dyes, indocyanine dyes, cyanine dyes; squarylium dyes; chalcogenopyryloacrylidene dyes; croconium dyes; metal thiolate dyes; bis(chalcogenopyrylo) polymethine dyes; oxyindolizine dyes; bis(aminoaryl) polymethine dyes; merocyanine dyes; and quinoid dyes. Infrared-absorbing materials disclosed in U.S. Pat. Nos. 5,108,873, 5,036,040, 5,035,977, 5,034,303, 5,024,923, 5,019,549, 5,019,480, 4,973,572, 4,952,552, 4,950,640, 4,950,639, 4,948,778, 4,948,777, 4,948,776, 4,942,141, 4,923,638, 4,921,317, 4,913,846, 4,912,083, 4,892,584, 4,791,023, 4,778,128, 4,767,571, 4,675,357, 4,508,811, 4,446,223, 4,315,983, and 3,495,987, may also be suitable herein. A source of suitable infrared-absorbing dyes (including near-, mid-, and far-infrared absorbing dyes) is H. W. Sands Corporation, Jupiter, Fla. The infrared-absorbing dyes suitable for use in this invention have other characteristics listed below. Suitable dyes include 2-(2-(2-chloro-3-(2-(1,3-dihydro-1,1-dimethyl-3-(4-sulfobutyl)-2H-benz[e]indol-2-ylidene)ethylidene)-1-cyclohexene-1-yl)ethenyl)-1,1-dimethyl-3-(4-sulfobutyl)-1H-benz[e]indolium, inner salt, free acid having CAS No. [162411-28-1], available from H. W. Sands Corp., Jupiter, Fla. as SDA-4927; 2-[2-[2-(2-pyrimidinothio)-3-[2-(1,3-dihydro-1,1-dimethyl-3-(4-sulfobutyl)-2H-benz[e]indol-2-ylidene)]ethylidene-1-cyclopenten-1-yl]ethenyl]-1,1dimethyl-3-(4-sulfobutyl)-1H-benz[e]indolium, inner salt, sodium salt, having molecular formula C41H47N4NaO6S3 and molecular weight of about 811 grams per mole, available from H. W. Sands Corp., Jupiter, Fla. as SDA-5802; indocyanine green, having CAS No. [3599-32-4] and molecular weight of about 775 grams per mole, available from H. W. Sands Corp., Jupiter, Fla. as IR-125; 3H-indolium, 2-[2-[2-chloro-3-[(1,3-dihydro-1,3,3-trimethyl-2H-indol-2-ylidene)ethylidene]-1-cyclopenten-1-yl]ethenyl]-1,3,3-trimethyl-, salt with trifluoromethanesulfonic acid (1:1) having CAS No. [128433-68-1] and molecular weight of about 619 grams per mole, available from H. W. Sands Corp., Jupiter, Fla. as TIC-5C. Appropriate individual selections can be made from the above classes of dyes by a simple screening process of utilizing a candidate dye as detailed in the following.

In one embodiment of the invention, the infrared-absorbing dye is a cyanine dye chosen from one of the following structures:

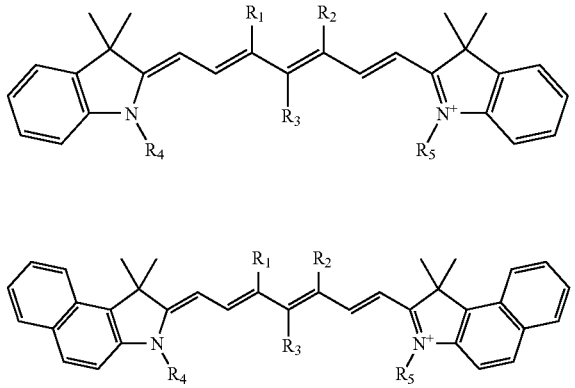

where $R_1$ and $R_2$ may be chosen independently or identically from hydrogen or alkyl groups having 1 to 6 carbons, and $R_1$ may be covalently joined to $R_2$ so as to form a ring of 5 or 6 carbon atoms such as when $R_1+R_2$ is —$CH_2$—$CH_2$— or —$CH_2$—$CH_2$—$CH_2$— respectively; $R_3$ is chosen from hydrogen, halogen chosen from fluorine, chlorine, bromine and iodine, alkyl groups having 1 to 6 carbon atoms, and oxygen or sulfur atoms bonded to alkyl, cycloakyl, aryl, and heterocyclic groups having from 1 to 10 carbon atoms and 0 to 3 nitrogen atoms; and $R_4$ and $R_5$ are chosen independently or identically from hydrogen, alkyl groups having from 1 to 6 carbon atoms, and ionized or unionized sulfobutyl and sulfopropyl groups (—$(CH_2)[_{3-4}]$ $SO_3$[— or H]). In cases where the cyanine dye is charged, a counter ion such as sodium, potassium, lithium, ammonium, perchlorate, triflouromethane sulfonate, p-toluenesulfonate, or other anion or cation is present.

The amount of infrared-absorbing dye in the donor is sufficient to absorb a fraction between zero and one of the infrared radiation impinging on the assemblage during the exposure step. In one embodiment, the infrared-absorbing dye is used with a laser emitting radiation at about 830 nanometers in wavelength in a dye amount that absorbs between about 1% and about 95% of 830 nanometer wavelength radiation passing through the donor in the shortest path direction, typically the thickness of a sheet of donor. In another embodiment, the infrared-absorbing dye is used in an amount that absorbs between about 40% and about 90% of 830 nanometer wavelength radiation passing through the donor in the shortest path direction, typically the thickness of a sheet of donor. In another embodiment, the infrared-absorbing dye is used in an amount that absorbs between about 50% and about 70% of 830-nanometer wavelength radiation passing through the donor in the shortest path direction, typically the thickness of a sheet of donor. This amount absorbed is easily determined spectrophotometrically by analysis of the radiation absorption properties at 830 nanometer wavelength of two separate simulated samples of donor, produced with and without the infrared-absorbing dye, to determine by difference the absorbance expected during exposure due to the absorbance contribution of the infrared-absorbing dye.

Some suitable donor or donor elements are disclosed for example in U.S. Pat. No. 5,773,188, U.S. Pat. No. 5,622,795, U.S. Pat. No. 5,593,808, U.S. Pat. No. 5,334,573, U.S. Pat. No. 5,156,938, U.S. Pat. No. 5,256,506, U.S. Pat. No. 5,427,847, U.S. Pat. No. 5,171,650 and U.S. Pat. No. 5,681,681. These donors may have been formulated with an inappropriate infrared-absorbing donor for use in this invention, which may not be thermally decolorized upon heating after the imaging step. The references cited herein are intended to illustrate a variety of transferable materials that may be present in the donor element of this invention, although the references are by no means all-inclusive.

The transferable material in the transferable layer of the donor comprises a material or combination of materials whose function is known in the art, such as one or more of a monomer, solvent, wax, plasticizer, colorant, dye, pigment, dispersant, surfactant, adhesive, cross-linker, conductor, reagent, and a binder comprising one or more of a polymer, oligomer, graft copolymer, and comb copolymer. The material or combination of materials of the transferable material is designed to impart a function, such as one chosen from adhesivity, strength, cohesive strength, elasticity, releasability, color, texture, conductivity, reactivity, cost and transparency.

In one embodiment, the transferable layer typically comprises an aqueous dispersion of the infrared absorbing dye, pigment colorant, surfactant binder.

Transferable materials may comprise polymers and oligomers or combination thereof as binder. Transferable materials may comprise one or more of cellulose derivatives, e.g., cellulose acetate hydrogen phthalate, cellulose acetate, cellulose acetate propionate, cellulose acetate butyrate, cellulose triacetate other cellulosic derivatives. Transferable materials may comprise one or more of homopolymers and copolymers of olefinic monomers including acrylic, methacrylic, vinylic, and styrenic monomers and esters. Acrylic and methacrylic monomers and esters include such materials as acrylic acid, methacrylic acid, and alkyl, aryl, aralkyl, and substituted esters having 1 to 20 carbon atoms such as methyl methacrylate, n-butyl acrylate, glycidyl methacrylate, ethyl acrylate, 2-phenyl ethyl acrylate, benzyl acrylate, pentabromobenzyl acrylate. Vinylic monomers and esters include such materials as acrylonitrile, vinyl ethers having from 1 to 20 carbon atoms such as methyl vinyl ether and n-butyl vinyl ether; vinyl chloride; vinyl acetate. Styrenic monomers include styrene, alpha-methyl styrene, and substituted styrenes having substituents with 1 to 20 carbon atoms such as 4-methyl styrene. Copolymers and homopolymers include copolymers of maleic anhydride with vinyl ethers such as methyl vinyl ether; polycyanoacrylates; polycarbonates; poly(vinyl acetate); poly(styrene-co-acrylonitrile); a polysulfone or a poly(phenylene oxide); vinyl copolymers such as vinyl chloride/vinyl acetate copolymers; polyvinyl butyrate, polyvinyl butyral, polyvinyl alcohol, polyvinyl chloride and the like; condensed polymers such as polyester, polyamide, polyimide and the like; polyether imide; polysulfone; polyether sulfone; aramide; rubber-type thermoplastic polymers such as butadiene/styrene copolymers; polyurethane; epoxy resin; urea/melamine resin and the like. Among these, polymers such as acrylics, polyvinyl alcohol, polyvinyl butyral, polyester and polyimide are preferably used. In one embodiment, a graft copolymer is formed of an oligomeric methyl methacrylate macromonomer copolymerized with methyl methacrylate, n-butyl acrylate, methacrylic acid, and glycidyl methacrylate.

Polymers and oligomers used as transferable materials can be made by conventional means such as addition polymerization, condensation polymerization, free-radical polymerization, living polymerization, solvent-borne polymerization, water-borne polymerization, emulsion polymerzation, and latex polymerization.

Examples of waxes include mineral waxes, natural waxes and synthetic waxes. Preferable examples of mineral waxes include petroleum waxes such as paraffin wax, microcrystalline wax, ester wax, oxidized wax and the like, as well as montan wax, ozokerite, ceresin and the like. Among these, paraffin wax is preferable. Paraffin wax is separated from petroleum and, depending on melting point, various kinds of paraffin wax are commercially available. Examples of natural waxes include vegetable waxes such as carnauba wax, Japan wax, ouricury wax, and espal wax and the like, as well as animal waxes such as beeswax, insect wax, shellac wax, spermaceti and the like. The synthetic waxes are used generally as lubricants, and are usually composed of higher fatty acid compounds.

Examples of plasticizers include ester compounds which are known plasticizers, for example, phthalates such as dibutyl phthalate, di-n-octyl phthalate, di(2-ethylhexyl) phthalate, dinonyl phthalate, dilauryl phthalate, butyl lauryl phthalate, butyl benzyl phthalate, and analogues; aliphatic dibasic acid esters such as di(2-ethylhexyl) adipate, di(2-ethylhexyl) sebacate, and analogues; phosphoric acid triesters such as such as tricresyl phosphate, tri(2-ethylhexyl) phosphate and analogues; polyol polyesters such as polyethylene glycol ester and the like; and epoxy compounds such as epoxy fatty esters.

The colorant in the transferable material may be a pigment or a dye. As is well known in the art, the introduction of pigments into compositions is most readily accomplished by employing pigment dispersants to prepare stable pigment dispersions which are then introduced. It is preferred to use a pigment as the colorant for stability and for color density, and also for the high decomposition temperature. The pigment is preferably chosen from pigments having (1) high transparency, and (2) small particle size, wherein the average particle size is less than about 100 nanometers. Some useful chemical classes of pigments include metal-containing phthalocyanines and halogenated derivatives, anthraquinones, quinacridones, epindolidiones, pyrazolones, acetoacetyl monoazo, bisazo, and methine. Some examples of pigments that can be used in this invention include RS Magenta 234-007™, GS Cyan 249-0592™, and RS Cyan 248-061, from Sun Chemical Co. (Fort Lee, N.J.); BS Magenta RT-333D™, Microlith Yellow 3G-WA™, Microlith Yellow 2R-WA™, Microlith Blue YG-WA™, Microlith Black C-WA™, Microlith Violet RL-WA™, Microlith Red RBS-WA™, Cromophthal Red 3B, Irgalite Blue GLO, and Irgalite Green 6G, from Ciba (Newport, Del.); Fanchon Fast Yellow 5700, from Bayer (Pittsburgh, Pa.); Rubine F6B (C.I. No. Pigment 184); Cromophthal™ Yellow 3G (C.I. No. Pigment Yellow 93); Hostaperm™ Yellow 3G (C.I. No. Pigment Yellow 154); Monastral™ Violet R (C.I. No. Pigment Violet 19); 2,9-dimethylquinacridone (C.I. No. Pigment Red 122); Indofast™ Brilliant Scarlet R6300 (C.I. No. Pigment Red 123); Quindo Magenta RV 6803; Monstral™ Blue G (C.I. No. Pigment Blue 15); Monstral™ Blue BT 383D (C.I. No. Pigment Blue 15); Monstral™ Blue G Br 284D (C.I. No. Pigment Blue 15); Monstral™ Green CT 751 D (C.I. No. Pigment Green 7); any of the Heucotech Aquis II™ series; any of the Heucosperse Aquis III™ series; and the like.

Examples of colorants include dyes such as the following: Anthraquinone dyes e.g., Sumikaron Violet RS™ (product of Sumitomo Chemical Co., Ltd.), Dianix Fast Violet 3R-FS™ (product of Mitsubishi Chemical Industries, Ltd.), and Kayalon Polyol Brilliant Blue N-BGM™ and KST Black 146™ (products of Nippon Kayaku Co., Ltd.); azo dyes such as Kayalon Polyol Brilliant Blue BM™, Kayalon Polyol Dark Blue 2BM™, and KST Black KR™ (products of Nippon Kayaku Co., Ltd.), Sumikaron Diazo Black 5G™ (product of Sumitomo Chemical Co., Ltd.), and Miktazol Black 5GH™ (product of Mitsui Toatsu Chemicals, Inc.); direct dyes such as Direct Dark Green B™ (product of Mitsubishi Chemical Industries, Ltd.) and Direct Brown M™ and Direct Fast Black D™ (products of Nippon Kayaku Co. Ltd.); acid dyes such as Kayanol Milling Cyanine 5R™ (product of Nippon Kayaku Co. Ltd.); basic dyes such as Sumiacryl Blue 6G™ (product of Sumitomo Chemical Co., Ltd.), and Aizen Malachite Green™ (product of Hodogaya Chemical Co., Ltd). The above dyes may be employed singly or in combination. Combinations of pigments and/or dyes can also be used.

Surfactants can be used in the donor, particularly in the transferable material, typically as a coating aid during application of the transferable material onto the support as is well known in the art. Typical surfactants include ionic and nonionic, hydrogen substituted and fluorine substituted compounds such as alkylaryl polyether alcohols with alkyl groups having 4 to 40 carbon atoms, (e.g. octylphenol ethylene oxide condensate known as TRITON X-100, available from Rohm & Haas, Philadelphia, Pa.); fluorosurfactants (e.g. FC-170C and FC-340 and other fluorochemical surfactants from 3M, St. Paul, Minn., and Zonyl® FSA fluorosurfactant from DuPont, Wilmington, Del.); and alkyl and arylalkyl sulfates having from 4 to 40 carbon atoms (e.g. ammonium lauryl sulfate). Other suitable surfactants can easily be determined by experimentation to determine coating quality.

Ingredients of the transferable material may be carried in solvents, water, or mixtures of solvents and water. Solvents and water can later be removed during coating by common means such as evaporation.

The transferable layer comprising a transferable material and an infrared-absorbing dye may itself be composed of either a single layer or multiple layers. The transferable material and the infrared-absorbing dye may be homogeneously or inhomogeneously mixed, dispersed together, layered separately, or combined in a combination the preceding ways. Conventional mixers, coaters, driers, extruders, laminators, and related application equipment can be used to form the transferable layer and attach it to the support. In one embodiment of the donor, the transferable layer adjacent to and contacting the support has a thickness of about 0.1 micron to about 10 microns. In another embodiment of the donor, the transferable layer adjacent to and contacting the support has a thickness of about 0.5 micron to about 3 microns.

In one embodiment of a donor, a mixture in water of a transferable material comprising an aqueous dispersion of a pigment and dispersant, an amine-neutralized free-radical-polymerized (meth)acrylic latex, and an infrared-absorbing dye is coated onto the chrome layer of a chrome-sputtered blue-dyed polyethylene terephthalate film support (the support having 50% transmission at 830 nanometers, 50 microns thick in total) and dried in air at less than 100 degrees Celsius to obtain a 1 micron thick dried transferable layer on the support. The donor is used with a receiver in an assemblage.

In this invention, the assemblage also comprises a receiver. Suitable receivers are composed of glass, coated glass, polymeric films, metal foils, circuit boards, and other films, foils, and objects suitable for functionalization by thermal transfer methods. The receiver can be a homogeneous object such as a sheet of glass, or a complex assemblage such as a partially-functionalized three-color filter comprising a sheet of glass, an opaque black mask having rectangular windows typically each 30 microns by 150 microns, and a thermally-transferred layer of red transparent material filling one third of the windows. The receiver can be used in more than one assemblage in separate thermal transfer processes with one or more donors. The receiver can permanently hold the thermally transferred material, or the thermally-transferred material can be transferred from the original temporary receiver to another object known as a secondary permanent receiver, such as one of glass, coated glass, polymeric films, or other materials suitable for receivers. Typically, sheet and film materials used for the support of the donor film can also be used as a flexible component of the receiver, especially a temporary receiver. One example is a film of ethylene vinyl acetate copolymer. The glass used in the invention for a receiver can be any glass such as borax glass, borosilicate glass, chromium glass, crown glass, flint glass, lime glass, potash glass, silica-flint glass, soda glass, and zinc-crown glass. In a preferred embodiment, borosilicate glass is employed.

Coatings for the receiver are optional but may be used to improve adhesion of the transferable material. The coating may comprise one or more of, for example, a surfactant as defined above; a polymer such as a polycarbonate; a polyurethane; a polyester; polyvinyl chloride; styrene/acrylonitrile copolymer; poly(caprolactone); vinylacetate copolymers with ethylene and/or vinyl chloride; (meth)acrylate homopolymers (such as butyl-methacrylate) and copolymers; coating aids, solvents, and mixtures thereof. This coating may be present in any amount effective for the intended purpose. In general, good results have been obtained at coating weights of 1 to 5 grams per square meter. Alternately, the coating may comprise a low molecular weight crosslinkable binder having a number average molecular weight of about 1,500 to about 70,000. One suitable coating mixture is a blend of a (meth)acrylic latex of methyl methacrylate, glycidyl methacrylate, methacrylic acid, and n-butyl acrylate combined with a fluorsurfactant, an organic base, an organic solvent, and water, which can be applied by conventional techniques to a rigid or flexible substrate and dried to give a receiver.

An assemblage is produced using at least a donor and a receiver. The donor is brought into contact with the receiver at the surface of the transferable layer of the donor. Contact may be total, such that the total surface of the transferable layer of the donor is covered by and in contact with the receiver, or it may be partial. Partial contact of the surface of the transferable layer with the receiver can occur if the surface of the donor is rough or if the surface of the receiver is rough. Partial contact can also occur if the receiver surface is textured (for example by a previous thermal transfer, or by an inherent texture such as found in a fresnel lens). It is preferable if contact is a close contact in the regions where transfer of material is intended. Close contact includes total contact and a distance of separation up to 100 microns. In one embodiment, the distance of separation between donor and receiver in regions intended for thermal transfer is from zero microns to less than 5 microns.

The assemblage is normally prepared following removal of coversheet(s), if present, from the donor and receiver, and by placing the donor adjacent to the receiver such that the donor touches the receiver element. Vacuum and/or pressure can be used to hold the donor and receiver together. Alternately, the donor and receiver may be spaced slightly apart using spacer particles in the donor layer or the image-receiving layer. As another alternative, the donor and receiver can be held together by fusion of layers at the periphery. As another alternative, the donor and receiver can be taped together and taped to the exposure apparatus, or a pin/clamping system can be used. As yet another alternative, the donor can be laminated to the receiver element to provide the assemblage. The assemblage can be conveniently mounted on a drum to facilitate infrared radiation exposure.

The infrared exposure step is preferably effected at a laser fluence of about 600 millijoules per square centimeter or less, most preferably about 250 millijoules per square centimeter to 440 millijoules per square centimeter. Various types of lasers can be used to expose the assemblage. The laser is preferably one emitting in the infrared, near-infrared or visible region. Particularly advantageous are diode lasers emitting in the region of 750 nanometers to 870 nanometers that offer a substantial advantage in terms of their small size, low cost, stability, reliability, ruggedness and ease of modulation. Diode lasers emitting in the range of 780 nanometers to 850 nanometers are also preferred. Such lasers are available from, for example, Spectra Diode Laboratories (San Jose, Calif.).

The exposure typically takes place through the support of the donor. In most cases, the donor support will be a film that is transparent to infrared radiation and the exposure is conveniently carried out. However, if the receiver element is appropriately transparent to infrared radiation, the process of the invention can also be carried out by imagewise exposing the receiver to infrared laser radiation.

The assemblage is exposed imagewise so that some portion of the exposed areas of the transferable material of the donor are transferred to the receiver element in a pattern closely related to the pattern of imagewise exposure. The pattern itself can be, for example, in the form of dots or line work generated by a computer, in a form obtained by scanning artwork to be copied, in the form of a digitized image taken from original artwork, or a combination of any of these forms that can be electronically combined on a computer prior to laser exposure. The laser beam and the laserable assemblage are typically in constant motion with respect to each other, such that the laser as needed individually addresses each minute area of the assemblage, i.e., "pixel". This may be accomplished by mounting the laserable assemblage on a rotatable drum. A flat-bed recorder can also be used to move the assemblage with respect to the laser. The laser can be fixed or movable. Suitable apparatus for holding and exposing an assemblage are commercially available, for example a Creo Model 3244 Spectrum Trendsetter® thermal imaging device (Creo Inc., Vancouver, Canada).

The next step in the process of the invention is separating the support from the receiver. Usually simply peeling the two elements apart accomplishes this. Peeling generally requires very little peel force, and is accomplished by simply separating the donor support from the receiver. Separation can be done using any conventional separation technique such as peeling or lifting, and can be manual or automatic without operator intervention.

The separation process results in a laser-generated image, also known as the colored image, preferably a halftone dot image, comprising the transferred exposed areas of the transferable material of donor, being present on the receiver. The image formed by the exposure and separation steps can be a laser-generated halftone dot color image formed as a layer on a receiver.

The imaged receiver or spent donor can be incorporated as a receiver into a new assemblage in order to imagewise transfer other material in a subsequent, often different, imagewise exposure step as above described. Such repeated processes can produce an imaged receiver incorporating different materials that have each been imagewise transferred or retained using different assemblages. The different materials may each comprise a different colorant, for example to produce a multicolor proof of cyan, magenta, yellow and black or a color filter of red, green and blue.

The original receiver portion of the imaged receiver can be a temporary carrier of transferred material, as when the original receiver is later separated from the transferred material. Analogously, the support of a spent donor may later be separated from the untransferred material.

In the invention, a heating step is used after the exposure step to thermally decolorize the infrared-absorbing dye, decreasing the presence of the infrared-absorbing dye in the imaged receiver. Suitable infrared-absorbing dyes are easily identified using the methods detailed herein. Appropriate conditions for heating the imaged receiver are also easily determined for any specific suitable infrared-absorbing dye, for example by means of spectrophotometrically recording the corresponding decreases in the absorbance of radiation characteristic of the infrared-absorbing dye, either directly on the imaged receiver or on a suitable test object as demonstrated in the examples. A useful decrease is of about 50% to about 100% of any of the absorbency, at a wavelength where absorbency is attributable to the infrared-absorbing dye. Such a decrease of absorbancy at the wavelength demonstrates the thermal decolorization of the infrared-absorbing dye in a corresponding amount. Such a useful thermal decolorization is a typical embodiment of the invention. Decreases of the absorbency are illustrated in the examples below.

Thermal decolorization of an infrared-absorbing dye is herein defined to be a decrease in the amount of the infrared-absorbing dye ("decolorization") in the heated portion of material derived from the original donor ("thermal"), thereby decreasing or eliminating the color contribution of the infrared-absorbing dye to the heated portion of material. Thermal decolorization is a step distinct from any decolorization that may occur due to heating from the absorption of radiation in the image-wise irradiation step.

The thermal decolorization may occur by one or more mechanisms, for example the infrared-absorbing dye might sublime out of the heated portion, the infrared-absorbing dye might unimolecularly decompose, or it might react with another component such as one of a nucleophile, an electrophile, a reducing agent, and an oxidizing agent to decrease the color. Typically the thermal decolorization is by means of a chemical change into products having less absorbance at noticeable wavelengths.

Although the term "bleaching" is sometimes loosely used synonymously with "decolorizing", decolorizing can be understood to be a broader term when used herein. Bleaching of an infrared-absorbing dye is considered to be a decrease in the amount of the infrared-absorbing dye (the material bleached) which is simultaneous with a decrease in the amount of a bleaching agent, due to reaction of the infrared-absorbing dye with the bleaching agent. The bleaching agent is typically chosen from one of an oxidizing agent and a reducing agent, and is different from the infrared-absorbing dye. Bleaching will not occur if the bleaching agent that causes the bleaching is absent. Bleaching processes with a bleaching agent that are initiated or improved by radiation are typically called photobleaching processes; those that are initiated or improved by heat are called thermal bleaching processes. Bleaching can occur using bleaching agents which are intentionally added, such as liquid or solid bleaching agents formulated into a donor during donor manufacture or combined with the infrared-absorbing dye after the exposure of the donor. Bleaching can also occur by means of adventitiously present bleaching agents. Examples of adventitiously present bleaching agents include oxygen and ozone present in the air, which can permeate the material comprising the infrared-absorbing dye, and small amounts of polymerization initiators present in polymer formulations. A free-radical initiator residue present in a polymer or binder preparation, such as traces of ammonium persulfate remaining after more than 80% of the originally added initiator has decomposed, also constitutes an adventitiously present bleaching agent, not an intentionally added bleaching agent. In all embodiments of this invention, the amount of any intentionally added bleaching agent consumed during the heating for thermal decolorization does not account for the extent of thermal decolorization of the infrared absorbing dye, because other mechanisms of thermal decolorization besides thermal bleaching by intentionally added bleaching agent are at work.

The art of bleaching an infrared absorbing dye by adding a bleaching agent is well known. Usually the bleaching agent is added in an effective amount, easily determined in comparison to the amount of dye which must be bleached and the efficiency of the bleaching agent, and easily determined by experimentation for a given combination of dye and bleaching agent. One theoretically effective amount of bleaching agent that can be used is one molecule of bleaching agent for each molecule of dye which will be decolorized by the action of the bleaching agent. Since such an amount of bleaching agent may be experimentally found to be too small if the bleaching agent is not used efficiently in the bleaching process, more can optionally be used. Bleaching agents may be used in the instant invention, however it is preferred to avoid their use.

Intentionally added bleaching agents can comprise one or more free radical generating compounds. Examples include diacryl peroxides with each acryl group independently containing an alkyl, aryl, or aralkyl group having from 1 to 20 carbon atoms such as benzoyl peroxide; dialkyl peroxides with each alkyl group independently having from 1 to 20 carbon atoms, such as di-tert-butyl peroxide; hydroperoxides of alkyl or aralkyl alcohols having from 1 to 20 carbon atoms such as cumyl hydroperoxide and tert-butyl hydroperoxide; and azo compounds having 2 to 30 carbon atoms such as azo-bis-isobutyronitrile (AIBN). Hexaarylbiimidazoles are suitable free-radical generating compounds that consist essentially of a symmetric or asymettric oxidative arylimidazole dimer. Each of the six aryl groups of the hexaarylbiimidazole can be substituted by hydrogen atoms at any position or independently substituted with an alkyl group of 1 to 20 carbon atoms, an alkoxy group of 1 to 20 carbon atoms, a mono or di-substituted amino group, each substituent of 1 to 20 carbon atoms, a cycloalkyl group having 5 to 7 carbon atoms in the ring, an electron-rich heterocyclic group having 5 to 7 atoms in the ring, a halogen, or other substituents well known in the art.

Intentionally added bleaching agents can include sulfur compounds, for example either oxidizing or reducing sulfur compounds having sulfur-sulfur bonds, sulfur-carbon double bonds, and sulfur-oxygen-oxygen bonds. The sulfur compounds include thiurams, dithiocarbamates, sulfenamides, thiazoles, xanthogenates, thioureas, and guanidines, substituted by aryl, alkyl, and aralkyl groups of 1 to 20 carbon atoms, and their metal salts, specifically, nickel dibutyldithiocarbamate, zinc dimethyldithiocarbamate, ferric dimethyldithiocarbamate, zinc dibutyldithiocarbamate, zinc butylxanthogenate, tetramethylthiuram monosulfide, tetramethylthiuram disulfide, 2-mercaptobenzothiazole, tetraethylthiuram disulfide, tetrabutylthiuram disulfide, dipentamethylenethiuram tetrasulfide, dibenzothiazyl disulfide, zinc 2-mercaptobenzothiazole, 2-(4,4'-morpholinodithio) benzothiazole, N,N-diethylthiocarbamoyl-2-benzothiazolyl sulfide, N-cyclohexyl-2-benzothiazolyl sulfenamide, N-t-butyl-2-benzothiadizolyl sulfenamide, N-oxydiethylene-2-benzothiazolyl sulfenamide, N,N'-dicyclohexyl-2-benzothiazolyl sulfenamide, 1,3-diphenylguanidine, di-o-tolylguanidine, di-o-tolylguanidine salt of dicatecholborate, hexamethylene tetramine, zinc dialkyldithiophosphenate, N-t-butyl-2-benzothiazylsulfenamide, a reaction product of N-butylaldehyde and aniline, N,N'-diphenylthiourea, trimethylthiourea, etc. may be mentioned. In particular, as a sulfenamide agent, N-cyclohexyl-2-benzothioazolyl sulfenamide, N-t-butyl-2-benzothiazolyl sulfenamide, and N,N'-dicyclohexyl-2-benzothiazyl sulfenamide can be used, while as a thiuram agent, tetramethylthiuram monosulfide, tetramethylthiuram disulfide, 2-mercaptobenzothiazole, tetraethylthiuram disulfide, tetrabutylthiuram disulfide, and dipentamethylenethiuram tetrasulfide can be used. Any persulphate such as one of ammonium, sodium, and potassium persulphate can be used.

Intentionally added bleaching agents can include reducing agents, particularly those which act upon the infrared-absorbing dye during the radiation exposure step of imaging.

Reducing agents suitable for use are generally good electron donors, i.e., have a low oxidation potential, typically less than 1.0V, and preferably not less than 0.40V. Depending on the choice of infrared-absorbing dye, they may be neutral molecules or anionic groups. Examples of reducing agents which are anionic groups include the salts of N-nitrosocyclohexylhydroxylamine, N-phenylglycine salts and organoborate salts comprising an anion of boron having four independent substituents, selected from the group of alkyl, aryl, arakyl, alkenyl, alkynyl, silyl, alicyclic, and saturated, and unsaturated heterocyclic groups, including substituted derivatives of these groups, with the proviso that at least one of the independent substituents is an alkyl group of up to 8 carbon atoms. 1,4-Dihydropyridine derivatives such as those having two acyl substituents and zero to four other substituents are also suitable reducing agents, as enumerated by Patel et. al. in U.S. Pat. No. 6,171,766.

However, in one embodiment of the invention, the process is free of such intentionally added bleaching agent for removing unwanted color of the infrared absorbing dye. This invention can avoid the need for a bleaching agent to be incorporated into the donor or otherwise to be used in the thermal imaging process, for example by intentional introduction of a solid or liquid bleaching agent after the exposure step. The present invention achieves many or all of the goals of bleaching agents in what is often a less complex, less physically damaging, more controllable, and more stable manner. Small amounts of bleaching agent, insufficient to thermally decolorize the infrared-absorbing dye, can be present in an embodiment of the invention without interfering with the utility of heating to produce thermal decolorization.

The removal of the infrared-absorbing dye by thermal decolorization can be monitored and demonstrated by conventional techniques. For example, the amount of infrared-absorbing dye in a material can often be determined using absorption spectroscopy, such as UV-visible and IR spectroscopy, in a non-destructive manner. In one embodiment of the invention, a donor material layer, intended for selective transfer from the donor to the receiver by means of the exposure, could be a blend of ingredients (excluding significant amounts of bleaching agents) and an infrared-absorbing dye. In this specific embodiment, the blend of ingredients has essentially no contribution to the absorbance of radiation of 830 nanometer wavelength when such radiation is passed through the donor material layer (as can easily be experimentally verified, as shown in the examples). The infrared absorbing dye, having a significant absorption or absorption maximum at a wavelength of 830 nanometers, can be formulated into the donor material layer at a concentration which absorbs about 50% of the 830 nanometer radiation passing through the donor material layer (corresponding to a spectrum showing an absorbance of about 0.69 absorbance units at 830 nanometers, contributed by the infrared-absorbing dye).

An exposure of the donor material layer to laser light of 830 nanometer wavelength is used to imagewise heat the donor material layer and imagewise transfer it to a receiver. After the spent donor is removed, analysis of the transferred material on the receiver can reveal that it still absorbs about 0.69 absorbance units of radiation at the 830 nanometer wavelength, confirming that the exposure was ineffective in thermally decolorizing about 50% to 100% of the infrared absorbing dye; most commonly, almost none of the dye is removed by the very brief heating caused by the thermal imaging step. After the transferred material is oven-heated to 200 degrees Celsius for 120 minutes in air and thereafter cooled to room temperature, analysis of the oven-heated material on the receiver can reveal that it absorbs almost none (less than 0.01 absorbance units) of radiation passing through it at the 830 nanometer wavelength, confirming that the oven-heating was effective in thermally decolorizing about 100% of the infrared absorbing dye.

It is not entirely certain what changes occur to the infrared-absorbing dye in the heated material because of the heating. The infrared-absorbing dye might decompose unimolecularly, or by reaction with trace components in the sheet, such as nucleophiles, electrophiles, free radicals, conjugated unsaturated systems, etc. It is possible that the very small amounts of infrared-absorbing dye that are present are oxidized by oxygen or ozone transferred from that present in the atmosphere surrounding the material, whether in air or a partial-vacuum or reduced-pressure environment. The infrared-absorbing dye might actually be lost from the sheet without chemical change by sublimation. In any case, in one embodiment of the invention, the infrared-absorbing dye reacts to form new chemical compounds with radiation absorption characteristics different from those of the original infrared-absorbing dye. In one embodiment, the color of the transferred material held on the imaged receiver becomes closer to white after heating. In one embodiment, the color of the transferred material on the imaged receiver changes over time; and the change in color over time is smaller for transferred material that has been heated according to the principles of this invention than for unheated transferred material.

The temperature of the heating for thermal decolorization can range from about 100 degrees Celsius to about 350 degrees Celsius. The duration of the heating for thermal decolorization can be from about 2 minutes to over 1 day. Typically, an infrared-absorbing dye which is conveniently stable at room temperature will require a temperature of at least about 100 degrees Celsius and a duration of up to 1 day at elevated temperature for thermal decolorization. Thermal decolorization at over 350 degrees Celsius typically leads to undesired side-effects on other materials such as binders or permanent colorants. Duration of less than 2 minutes for thermal decolorization often leads to irreproducible effects due to non-uniform heating. However, the temperature and duration of heating can vary depending upon the IR dye and other components.

In one embodiment, heating the imaged receiver at 140 degrees Celsius for one hour in air and thereafter cooling produces a substantial decrease in the infrared radiation absorbance of the infrared-absorbing dye in the imaged receiver. In another embodiment, heating the imaged receiver at 200 degrees Celsius for 15 minutes in air and thereafter cooling produces a substantial decrease in the infrared radiation absorbance of the infrared-absorbing dye in the imaged receiver. Heating from about 100 degrees Celsius to about 350 degrees Celsius can be appropriate for the heating step of the invention. Typically, further decreases in the amount of infrared-absorbing dye detectable by its absorption characteristics are produced by longer heating times, until no infrared-absorbing dye can be detected. Heating time can even be days, although times under one day are more practical.

Heating temperatures are typically chosen to be as low as practical in order to minimize energy costs and minimize changes in other components of the receiver. For example, temperatures of 200 degrees Celsius in air can damage receivers composed of a single composition such as one of polyethylene terephthalate film or paper. Similarly, heating times are chosen to be practical-objects need time to heat up uniformly, but heating times should not be impractically long in terms of the total process time and economic penalty for the heating process as compared to alternatives (if available). In one embodiment, uniform heating can be achieved rapidly, even within a minute. Typically, lower temperatures can be used for longer heating times, while still achieving the same extent of thermal decolorization of the infrared-absorbing dye, which can be useful for heat-sensitive materials. These practical limitations on the choice of temperature and time of heating are well recognized in the art. Practical embodiments are easily determined by a few experiments.

After the heating, the thermally decolorized material is cooled. The cooling can be to any convenient temperature, for example between about 0 degrees Celsius and about 90 degrees Celsius. At these cooler temperatures, the rate of thermal decomposition typically declines substantially. A convenient final temperature for the cooling is ambient temperature.

Suitable infrared-absorbing dyes for this invention are easily identified by the techniques exemplified in the examples that follow; wherein a usefully-absorbing amount of the infrared-absorbing dye is incorporated into the transferable material, transferred to the receiver, and thermally decolorized by the heating step at a certain temperature for a known duration. In one embodiment, the thermal decolorization of the infrared-absorbing dye is not accompanied by a significant change in the color of the transferred material, because thermal decolorization is accompanied by other effects in the colorants, or masked by the color of the colorants. In another embodiment, the thermal decolorization of the infrared-absorbing dye is accompanied by a change in the color of the transferred material towards white. Infrared and visible light spectroscopy and color measurements can serve to demonstrate the practice and benefits of the present invention.

After the heating step that provides thermal decolorization in the present invention, the improved receiver objects having decreased content of the infrared-absorbing dye can be used in any application of thermally imaged objects.

One application is as a radiation filter, such as a monochrome filter or a color filter, used in a liquid crystal display or flat panel display which may display one (monochrome) or more colors including white, black, and greys. When incorporating the thermally imaged material in an object as a radiation filter for a liquid crystal display or flat panel display, the object may be subjected to further optional or required heating steps, such as annealing, curing, and depositing conductive coatings such as indium-tin-oxide (ITO), as are known in the art of color filter and liquid crystal display manufacture. These further heating steps may be carried out in air or specialized atmospheres such as nitrogen or helium gas, and at atmospheric, increased and reduced pressure, including vacuum. These further heating steps can be carried out at temperatures from about 50 degrees Celsius to about 400 degrees Celsius, for times ranging from a few minutes to many hours, for example from 2 minutes to 48 hours. In one embodiment, each later heating step of the thermally imaged object after thermal decolorization has a smaller effect on the color of the thermally imaged object than the thermal decolorization step. In another embodiment, each later heating step of the thermally imaged object after thermal decolorization is carried out at different conditions of temperature and duration chosen to obtain a useful result other than thermal decolorization.

The thermally decolorized objects of the present invention can be used in liquid crystal display devices such as a flat panel display. Liquid crystal display devices generally include two spaced, partially or fully transparent panels which define a cavity that is filled with a liquid crystal material. One partially transparent panel may comprise a monochrome or color filter of the present invention. For actively-driven devices, a transparent electrode is formed on one of the transparent panels, which electrode may be patterned or not, while individually addressable transparent electrodes are formed on the other of the transparent panels. Alignment layers are provided over the transparent electrode layers on both panels and are treated to orient the liquid crystal molecules in order to introduce a twist, e.g., of 90 degrees, between the panels. Thus, the plane of polarization of plane polarized light will be rotated in a 90 degree angle as it passes through the twisted liquid crystal composition from one surface of the cell to the other surface. Application of an electric field between the selected electrodes of the cell causes the twist of the liquid crystal composition to be temporarily removed in the portion of the cell between the selected electrodes. By use of optical polarizers on each side of the cell, polarized light can be passed through the cell or extinguished, depending on whether or not an electric field is applied.

Each of the individual electrodes has a surface area corresponding to the area of one monochrome or color element known as a pixel. If the device is to have color capability, each pixel must be aligned with a color area, e.g., red, green or blue, of a color filter. Depending upon the image to be displayed, one or more of the pixel electrodes is energized during display operation to allow full light, no light or partial light to be transmitted through the color filter area associated with that pixel. The image perceived by a user is a blending of colors formed by the transmission of light through adjacent color filter areas.

The polymeric alignment layer described above can be any of the materials commonly used in the liquid crystal art. Examples of such materials include polyimides, polyvinyl alcohol and methyl cellulose. The transparent conducting electrode described above is also conventional in the liquid crystal art. Examples of such materials include indium tin oxide, indium oxide, tin oxide and cadmium stannate.

The methods and objects of the invention can be better understood by considering the following examples. The techniques of example 1 can be applied in the manufacture of a color filter, when carried out using three separate thermal imaging steps of red, blue, and green donors ultimately transferred onto a single object (comprising glass and a mask) prior to the heating for thermal decolorization. The resulting improved decolorized color filter can be incorporated into an improved liquid crystal display useful for information display, for example in a computer display, cellular telephone, or television.

EXAMPLES

UV-Visible-NIR spectra were recorded on a Cary 100 Bio spectrophotometer (Varian Instruments, Walnut Creek, Calif.). Spectral data for color and whiteness were processed using the Grams 32/AI (v6.00) software (Thermo Galactic, Salem, N.H.). Color and whiteness were expressed using the CIE L*a*b* color system, of the Commission Internationale de l'Éclairage (CIE), where a* is the red-green contrast (a+ is a carmine red and a− is its opposite, blue green); b* is the yellow-blue contrast (b+ is light yellow and b− is deep blue), and L* is the luminosity dimension, ranging from 0 (pure black) to 100 (reference white). The distance in color space between two points can be expressed as delta a*b*, calculated as the root-mean-square distance between two colors. The calculations used a 2 degree observer and CIE Standard C illuminant.

Latex solids content was measured by putting about 5 grams of acrylic latex in a tared, 5-cm diameter aluminum pan, which was placed in a 75 degrees Celsius vacuum oven at about 50 kilopascals vacuum for several days. Fractional solids content was calculated by dividing the final sample weight by the initial sample weight; percent solids content is fractional solids content multiplied by 100.

Polymer Tg (glass transition temperature) values reported are mid-point temperatures in degrees Celsius from differential scanning calorimetry scans recorded according to ASTM D3418-82, measured on polymer samples dried as above.

Molecular weights were measured by gel permeation chromatography (GPC) by standard techniques vs. poly (methyl methacrylate) standards in tetrahydrofuran solutions of the latex.

Dynamic light scattering was performed using Brookhaven Instrument BI-9000AT digital correlator (Brookhaven Instruments, Brookhaven, N.Y.). An argon-ion laser with wavelength 488 nanometers and power 200 mW was used. Measurements were made at room temperature with scattering angle 60°. The latex samples were diluted in water by about 20,000 fold (200 μL sample into 20 mL water to make a first dilution, then again 100 μL of the first dilution into 20 mL water), and then filtered with 0.45 micron filter. The results are reported as diameter (particle size) in nanometer units. For general discussions of the determination of particle sizes by quasielastic light scattering, see "Paint and Surface Coatings: Theory and Practice", edited by R. Lombourne, Ellis Horwood Ltd., West Sussex, England, 1987, pp. 296–299, and "The Application of Laser Light Scattering to the Study of Biological Motion", edited by J. C. Earnshaw and M. W. Steer, Plenum Press, NY, 1983, pp. 53–76.

The coating weight (also known as areic mass density) of a coating on the sheet was measured by cutting out and weighing a 1 square decimeter piece of coated sheet, removing the coating by rubbing with a paper towel moistened in methanol, drying the uncoated sheet for several minutes at 50 degrees Celsius, and weighing the uncoated sheet. The coating weight in units of milligrams per square decimeter is the difference in weights of the coated 1 square decimeter donor sheet and uncoated sheet in milligrams. Coating weights of coatings on glass slides were estimated by comparing the radiation absorbencies of dyes or pigments with those of sheets of known coating weight and dye or pigment concentration.

SDA-4927 is an infrared-absorbing dye, namely 2-(2-(2-chloro-3-(2-(1,3-dihydro-1,1-dimethyl-3-(4-sulfobutyl)-2H-benz[e]indol-2-ylidene)ethylidene)-1-cyclohexene-1-yl) ethenyl)-1,1-dimethyl-3-(4-sulfobutyl)-1H-benz[e] indolium, inner salt, free acid having CAS No. [162411-28-1], available from H. W. Sands Corp., Jupiter, Fla. It has absorption maximum: 822 nanometers (in methanol), extinction coefficient 240,000 L/(mol·cm), melting point: 253–255 degrees Celsius (decomposition), solubility: 30 mg/mL (in methanol), appearance: dark green powder, molecular weight of about 827 grams per mole, and is synonomous with 2-[2-[2-(Chloro-3-[2-(1,3-dihydro-1,1-dimethyl-3-(4-sulfobutyl)-2H-benz[e]indol-2-ylidene)eth-ylidene]-1-cyclohexen-1-yl]ethenyl]-1,1-dimethyl-3-(4-sul-fobutyl-1H-benz[e]indolium, inner salt, free acid, CAS No: 162411-28-1.

SDA-5802 is an infrared-absorbing dye, 2-[2-[2-(2-pyri-midinothio)-3-[2-(1,3-dihydro-1,1-dimethyl-3-(4-sulfobu-tyl)-2H-benz[e]indol-2-ylidene)]ethylidene-1-cyclopenten-1-yl]ethenyl]-1,1dimethyl-3-(4-sulfobutyl)-1H-benz[e] indolium, inner salt, sodium salt, having molecular formula $C_{41}H_{47}N_4NaO_6S_3$ and molecular weight of about 811 grams per 30 mole, available from H. W. Sands Corp., Jupiter, Fla.

IR-125 is an infrared-absorbing dye, also known as indocyanine green, having CAS No. [3599-32-4] and molecular weight of about 775 grams per mole, available from H. W. Sands Corp., Jupiter, Fla.

TIC-5C is an infrared-absorbing dye, 3H-indolium, 2-[2-[2-chloro-3-[(1,3-dihydro-1,3,3-trimethyl-2H-indol-2-ylidene)ethylidene]-1-cyclopenten-1-yl]ethenyl]-1,3,3-trim-ethyl-, salt with trifluoromethanesulfonic acid (1:1) having CAS No. [128433-68-1] and molecular weight of about 619 grams per mole, available from H. W. Sands Corp., Jupiter, Fla.

A surfactant was appropriately used in coating compositions, namely Zonyl® FSA fluorosurfactant, at 50% solids in water, available from DuPont, Wilmington, Del.

A surfactant was appropriately used in latex synthesis at 0.5 wt % on solids, namely ammonium lauryl sulfate (CAS No. [2235-54-3], available as Polystep® B-7 ammonium lauryl sulfate (29% solids in water) from Stepan Co., Northfield, Ill.

Methyl methacrylate (MMA) has CAS No. [80-62-6] and was available from Aldrich Chemical, Milwaukee, Wis.

n-Butyl acrylate (BA, nBA) has CAS No. [141-32-2] and was available from Aldrich Chemical, Milwaukee, Wis.

Methacrylic acid (MAA) has CAS No. [79-41-4] and was available from Aldrich Chemical, Milwaukee, Wis.

Ammonium persulfate (CAS No. [7727-54-0], 99.99+%, having a molecular weight of about 228 grams per mole, is available from Aldrich Chemical, Milwaukee, Wis.

Isopropyl-bis(borondifluorodimethylglyoximato) cobaltate (III) (Co III DMG) catalyst was prepared using the techniques disclosed by Janowicz, et al. in U.S. Pat. No. 4,680,352, by Janowicz in U.S. Pat. No. 4,722,984, and by Hawthorne in European Patent EP0249614.

Other chemicals used herein were available from Aldrich Chemical, Milwaukee, Wis., or TCI America, Portland, Oreg., or were manufactured from such available chemicals by known techniques.

Synthesis of Chain Transfer Agent Solution CTA-1

A chain transfer agent solution CTA-1 was prepared as described in U.S. Pat. No. 5,362,826, Berge, et al. and U.S. Pat. No. 5,773,534, Antonelli, et al.

A 500-liter reactor was equipped with a reflux condenser and nitrogen atmosphere. The reactor was charged with methyl ethyl ketone (42.5 kg) and isopropyl-bis(borondif-luorodimethylglyoximato) cobaltate (III) (Co III DMG) catalyst (104 g) and the contents brought to reflux. A mixture of Co III DMG (26.0 g), methyl methacrylate (260 kg), and methyl ethyl ketone (10.6 kg) was added to the reactor over a period of 4 hours. Starting at the same time, a mixture of 2,2'-azobis(2-methylbutyronitrile) free radical initiator, (5.21 kg, Vazo® 67, DuPont, Wilmington, Del.) and methyl ethyl ketone (53.1 kg) was added to the reactor over a period of 5 hours. After the additions, the reactor contents were kept at reflux for another ½ hour. After cooling, this yielded 372 kg of a 70 weight percent solution, which was used directly for chain transfer polymerizations requiring CTA-1.

Synthesis of Latex PR-1

A suitable latex PR-1 was manufactured using ammonium persulfate as an initiator at 82 degrees Celsius to 88 degrees Celsius, using a monomer and chain transfer agent composition of 61 parts methyl methacrylate, 30 parts of n-butyl acrylate, 4.0 parts of CTA-1, 3 parts of methacrylic acid, and 2 parts of glycidyl methacrylate. PR-1 was characterized as 33.1% solids polymer on a weight basis, having a particle diameter average of 86 nanometers, a glass transition temperature of 55 degrees Celsius, a Mn of 20,000 grams per mole, and a Mw of 85,000 grams per mole. The latex was brought to a pH of 8.5 with 3% aqueous ammonia (approximately 0.25 parts ammonia per 10 parts solution) immediately prior to mixing with other ingredients.

Synthesis of Latex PR-2

A suitable latex PR-2 was manufactured using ammonium persulfate as an initiator at 82 degrees Celsius to 88 degrees Celsius. The synthesis of PR-2 used a 3-liter, round bottom flask equipped with a condenser, addition funnel, initiating solution inlet port, mechanical stirrer, heater and temperature controller probe, with the contents maintained under a nitrogen atmosphere. The flask was charged with 700 grams of deionized water and 6.90 grams of Polystep® B-7. A first initiating solution of 0.40 grams ammonium persulfate dissolved in 100 mL of deionized water was prepared. A first monomer blend of 96 grams methyl methacrylate, 4.0 grams glycidyl methacrylate, and 80.0 grams n-butyl acrylate was prepared and placed in the addition funnel. A second monomer blend of 96.0 grams methyl methacrylate, 4.0 grams glycidyl methacrylate, 80 grams n-butyl acrylate, and 40.0 grams of methacrylic acid was prepared. While stirring, the contents of the reaction flask were heated to 85 degrees Celsius and maintained at that temperature, within a range of 3 degrees Celsius, through the following steps.

The synthesis of the PR-2 was initiated by the first addition to the flask of 80 mL of the first initiating solution, followed within one minute by the second addition of 20 mL of the first monomer blend from the addition funnel. These two additions were completed in less than one minute. The remaining portion of first monomer blend in the addition funnel was added to the flask, beginning within two minutes, at a constant rate over a period of 60 minutes. At the end of the addition of the first monomer blend, the second monomer blend was promptly added within two minutes to the addition funnel and immediately thereafter was added to the flask at a constant rate over a period of 60 minutes total. When the addition of the second monomer blend was complete, the remaining initiating solution was promptly added in less than one minute. Stirring of the contents of the flask at 85 degrees Celsius plus or minus 3 degrees Celsius was maintained for 30 minutes after the completion of the addition of the initiating solution. Thereafter the contents of the reaction flask were cooled to ambient temperature and filtered through a fine paint strainer, (Paul N. Gardner Company, Inc. Pompano Beach, Fla., Item number ST-F 60×48 mesh) to provide the acrylic latex PR-2. PR-2 had a solids content of 33.4% by weight, a particle diameter of 91 nanometers, and a glass transition temperature of 32 degrees Celsius.

Synthesis of Latex PR-10

A suitable latex PR-10 was manufactured using ammonium persulfate as an initiator at 82 degrees Celsius to 88 degrees Celsius, using a monomer and chain transfer agent composition of 204 parts methyl methacrylate, 160 parts of n-butyl acrylate, 16 parts of CTA-1, 12 parts of methacrylic acid, and 8 parts of glycidyl methacrylate. The latex was brought to a pH of 8.5 with 3% aqueous ammonia (approximately 0.25 parts ammonia per 10 parts solution). PR-10 was characterized as 32.4% solids polymer having a particle diameter average of 73 nanometers, a glass transition temperature of 37 degrees Celsius, a Mn of 34,000 grams per mole, and a Mw of 125,000 grams per mole.

Synthesis of Latex PR-11

A suitable latex PR-11 was manufactured using ammonium persulfate as an initiator at 82 degrees Celsius to 88 degrees Celsius, using a monomer and chain transfer agent composition of 252 parts methyl methacrylate, 120 parts of n-butyl acrylate, 16 parts of CTA-1, and 12 parts of methacrylic acid. PR-11 was characterized as 32.9% solids polymer having a particle diameter average of 79 nanometers, a glass transition temperature of 58 degrees Celsius, a Mn of 30,000 grams per mole, and a Mw of 95,000 grams per mole.

Pigment Dispersions

Red

A suitable aqueous pigment dispersion PD-R3 of Pigment Red 254 at 24 weight percent pigment and pigment to binder ratio of 1.5 was used (Penn Color 32R238D, Penn Color, Pa.).

Yellow

A suitable aqueous pigment dispersion PD-Y1 of Pigment Yellow 83 at 28 weight percent pigment and pigment to binder ratio of 2.3 was used (Penn Color 32Y145D, Penn Color, Pa.).

Synthesis of Adhesive AP-1

A suitable adhesive AP-1 was made in a 3-liter, round bottom flask equipped with a condenser, addition funnel, initiating solution inlet port, mechanical stirrer, heater and temperature controller probe, with the contents maintained under a nitrogen atmosphere. The flask was charged with 700 grams of deionized water and 6.90 grams of a 30% solution of ammonium lauryl sulfate (Polystep® B-7). A first initiating solution of 0.40 grams ammonium persulfate dissolved in 100 mL of deionized water was prepared. A first monomer blend of 66.0 grams methyl methacrylate, 4.0 grams glycidyl methacrylate, and 110.0 grams n-butyl acrylate was prepared and placed in the addition funnel. A second monomer blend of 66.0 grams methyl methacrylate, 4.0 grams glycidyl methacrylate, 110.0 grams n-butyl acrylate, and 40.0 grams of methacrylic acid was prepared. While stirring, the contents of the reaction flask were heated to 85 degrees Celsius and maintained at that temperature, within a range of 3 degrees Celsius, through the following steps.

The synthesis of the adhesive acrylic latex was initiated by the first addition to the flask of 80 mL of the first initiating solution, followed within one minute by the second addition of 20 mL of the first monomer blend from the addition funnel. These two additions were complete in less than one minute. The remaining portion of first monomer blend in the addition funnel was added to the flask, beginning within two minutes, at a constant rate over a period of 60 minutes. At the end of the addition of the first monomer blend, the second monomer blend was promptly added within two minutes to the addition funnel and immediately thereafter was added to the flask at a constant rate over a period of 60 minutes total. When the addition of the second monomer blend was complete, the remaining initiating solution was promptly added in less than one minute. Stirring of the contents of the flask at 85 degrees Celsius plus or minus 3 degrees Celsius was maintained for 30 minutes after the completion of the addition of the initiating solution. Thereafter the contents of the reaction flask were cooled to ambient temperature and filtered through a fine paint strainer, (Paul N. Gardner Company, Inc. Pompano Beach, Fla., Item number ST-F 60×48 mesh) to provide the acrylic latex, AP-1 with particle size 88 nanometers, solids content of 33.5 weight percent, and glass transition temperature of 4 degrees Celsius.

The following examples illustrate certain features and advantages of the present invention. They are intended to be illustrative of the invention, but are not limiting. All parts and percentages are by weight, unless otherwise indicated.

Example 1

Example 1 illustrates an embodiment of the invention in a thermal imaging red formulation with an infrared-absorbing dye, in a series of steps suitable to the manufacture of a color filter.

A red composition was made by combining 0.026 parts SD-4927 infrared-absorbing dye, 1.465 parts 32R238D, 0.419 parts 32Y145D, 2.118 parts latex PR-1 (pH 8.5), 0.030 parts Zonyl® FSA fluorosurfactant, and 5.943 parts water to obtain a 15% solids composition. The composition was coated on the metallized surface of a metallized, colored polyester film. The metallized, colored polyester film was previously metallized on one surface with a thin coating of chromium providing 50% transmission of radiation (CP Films, Martinsville, Va.). The colored polyester film that was metallized was 102 microns in thickness, and contained a colorant at a concentration that provided an optical density of (0.6+/−0.1) units at 670 nanometers for the 102 micron path length, and an optical density of less than 0.1 units for the 102 micron path length at 830 nanometers (Melinex® 6442 polyester film, DuPont Teijin Films, Wilmington, Del.). The Melinex® 6442 polyester film was coated using a number 6 wire-wound rod using an automated rod coater (Waterproof® CV Coater, DuPont, Wilmington, Del.). The coated film was dried at 50 degrees Celsius for 5 minutes in flowing air to provide a donor sheet DF-1. The coating weight of the red donor layer was 18.3 milligrams per square decimeter. A UV-visible transmission difference spectrum UVV-1 was recorded using uncoated film (the metallized colored polyester film) as the reference spectrum.

A receiver composition was made by combining 12,574 parts PR-2 latex, 43.2 parts Zonyl® FSA fluorosurfactant, 109.6 parts N,N-dimethylethanolamine (CAS # [108-01-0]), 1106 parts n-butyl cellosolve (CAS # [111-76-2]), and 22186 parts distilled water. The receiver composition was coated to achieve a dry coating weight of 30 milligrams per square decimeter on a supporting base film on the ethylene vinyl acetate copolymer side. The supporting base film was made up of 64-micron thick ethylene vinyl acetate copolymer (Elvax® 550 ethylene vinyl acetate copolymer, DuPont, Wilmington, Del.) coated onto 102-micron thick polyethylene terephthalate (Cronar® 471X polyester photographic film base, DuPont Teijin Films). The coated receiver composition was dried on the supporting base at temperatures that increased from an initial value of 38 degrees Celsius to a final value of 65 degrees Celsius over 5 minutes to give a receiver film RF-1. The new smooth coated surface of the dried film was covered with a smooth polyethylene coversheet to prevent contamination of the coated surface during subsequent handling, resulting in covered film RF-1C.

An imageable assemblage was assembled on the drum of a conventional drum type imager comprising a Creo Model 3244 Spectrum Trendsetter® thermal imaging device (Creo Inc., Vancouver, Canada) equipped with a 20-Watt laser write head operating at a wavelength of 830 nanometers, and a focussing laser head. The first component of the imageable assemblage placed on the vacuum hold down drum was a 30 centimeter by 30 centimeter square of the receiver film RF-1C with the smooth polyethylene coversheet away from the drum. After the removal of the smooth polyethylene coversheet from the receiver film, a 35 centimeter by 35 centimeter square of the donor sheet DF-1 was placed completely overlapping RF-1 as the second and final component of the imageable assemblage, with the red coated surface of the donor sheet contacting the smooth coated surface of the receiver film and the drum. Air was removed from between the donor sheet and the receiver film by the drawdown of the vacuum hold down drum to provide the imageable assemblage ready for imaging. The assemblage was imaged under computer control by the Trendsetter® thermal imaging device to expose a completely-colored area approximately 50 millimeters by 75 millimeters in area using the 830 nanometer laser exposed onto the polyester side of the donor sheet at a laser power setting of 4 watts, and a drum rotation speed of 66 revolutions per minute to achieve a nominal exposure energy density of 440 millijoules per square centimeter. Peeling apart separates the imaged assemblage, yielding a spent donor, and an imaged receiver having the completely-colored area.

A glass microscope slide (50 millimeters by 75 millimeters, VWR International, West Chester, Pa.) was coated using a spin coater at 1000 RPM with a 5 weight percent solids solution of adhesive AP-1 in 6% n-butyl cellosolve in water, and dried at room temperature for 24 hours to make a coated glass receiver.

The completely-colored area of the imaged receiver was aligned to cover the coated glass receiver and the completely-colored area was brought into contact with the adhesive coated surface to form a lamination package. The lamination package was laminated at 82 degrees Celsius and 2.9 megapascals pressure for 3.5 minutes in a Tetrahedron Model MTP13 laminator. The lamination package was removed from the laminator and allowed to cool to room temperature and then the receiver supporting base film was peeled from the lamination package to leave the completely-colored area bonded to the surface of the glass microscope slide. A UV-visible transmission difference spectrum UVV-2 was recorded using an uncoated glass slide as the reference.

The completely-colored area bonded to the surface of the glass microscope slide was heated to 200 degrees Celsius for 1 hour in an oven in an atmosphere of air. A UV-visible transmission difference spectrum UVV-3 was recorded using an uncoated glass slide as the reference.

TABLE 1

Useful Thermal decolorization of Infrared-absorbing dye by Heating

| Wavelength (nanometers) | Absorbance versus Reference | | |
|---|---|---|---|
| | UVV-1 | UVV-2 | UVV-3 |
| 450 | 1.5386 | 1.4423 | 1.4754 |
| 550 | 1.9025 | 1.7684 | 1.7593 |
| 650 | 0.0163 | 0.0322 | 0.0187 |
| 750 | 0.1601 | 0.1761 | 0.0221 |
| 840 | 0.4504 | 0.4431 | 0.0441 |
| 850 | 0.4279 | 0.4269 | 0.0431 |

The data of Table 1 indicate that the SDA-4927 concentration in the colored layer does not change significantly on thermal imaging and that the heating step transforms more than 80% of the SDA4927. Note that the absorbance values at the wavelengths of 840 and 850 nanometers, characteristic of the SDA-4927 are similar before (UVV-1) and after (UVV-2) imaging, and greatly diminished after heating (UVV-3). The absorbance at wavelengths characteristic of visible light are hardly changed by the imaging and heating.

Comparative Example 2

Comparative Example 2 illustrates the absorbance in a thermal imaging red formulation prior to addition of an infrared-absorbing dye, both with and without heating the red formulation. In the following example, the incompletely formulated thermal imaging red formulation is applied directly to a glass slide in order to expeditiously determine the absorbance spectrum, as opposed to being applied to a donor support and being thermally imaged using a laser as described in Example 1.

A red composition was made by 1.465 parts 32R238D, 0.419 parts 32Y145D, 2.195 parts latex PR-1 (pH 8.5), 0.030 parts Zonyl® FSA fluorosurfactant, and 5.892 parts water to obtain a 15% solids composition. The composition was coated on a 50 millimeter by 75 millimeter glass slide using a number 6 wire wound rod and dried in an oven at 50 degrees Celsius for 15 minutes to obtain a sample with dry coating weight of approximately (20+/−2) milligrams per square decimeter. A UV-visible spectrum of the sample was recorded; the absorbance at the wavelength 825 nanometers was 0.0066 absorbance units. The sample was heated in air at 200 degrees Celsius in an oven for 60 minutes. After the sample cooled to room temperature, a UV-visible spectrum of the sample was recorded; the absorbance at the wavelength 825 nanometers was 0.0031 absorbance units. The decrease of 0.0035 absorbance units versus the same sample before heating was due to a combination of changes in absorbance due to heating not due to infrared-absorbing dye and the inexact nature of the measurement.

Example 3

Example 3 illustrates the thermal decolorization of infrared-absorbing dye in a thermal imaging red formulation by heating the red formulation.

A red composition was made by combining 0.026 parts SD-4927 infrared-absorbing dye, 1.465 parts 32R238D, 0.419 parts 32Y145D, 2.118 parts latex PR-1 (pH 8.5), 0.030 parts Zonyl® FSA fluorosurfactant, and 5.943 parts water to obtain a 15% solids composition. The composition was coated on a 50 millimeter by 75 millimeter glass slide using a number 6 wire wound rod and dried in an oven at 50 degrees Celsius for 15 minutes to obtain a sample with dry coating weight of approximately (27+/−3) milligrams per square decimeter. A UV-visible spectrum of the sample was recorded; the absorbance at the wavelength 825 nanometers was 0.7305 absorbance units. The increase of 0.7239 absorbance units over Comparative Example 2 (approximately a 100-fold increase) was due to the infrared-absorbing dye. The sample was heated in air at 200 degrees Celsius in an oven for 60 minutes. After the sample cooled to room temperature, a UV-visible spectrum of the sample was recorded; the absorbance at the wavelength 825 nanometers was 0.0680 absorbance units. The decrease of 0.6559 absorbance units versus the same sample before heating was due to thermal decolorization of the infrared-absorbing dye. At least 90% of the infrared-absorbing dye was thermally decolorized to materials with lower characteristic absorbance at 825 nanometers.

The red composition was suitable for thermal imaging using an 830 nanometer infrared laser as in commercially available thermal imagers such as the Creo 3244 Spectrum Trendsetter® thermal imaging device (manufactured by Creo, Vancouver, BC), to manufacture objects such as multicolor proofs and color filters using known techniques.

Example 4

Example 4 illustrates the thermal decolorization of infrared-absorbing dye in a thermal imaging red formulation by heating the red formulation.

A red composition was made by combining 0.026 parts IR-125 infrared-absorbing dye, 1.465 parts 32R238D, 0.419 parts 32Y145D, 2.118 parts latex PR-1 (pH 8.5), 0.030 parts Zonyl® FSA fluorosurfactant, and 5.943 parts water to obtain a 15% solids composition. The composition was coated on a 50 millimeter by 75 millimeter glass slide using a number 6 wire wound rod and dried in an oven at 50 degrees Celsius for 15 minutes to obtain a sample with dry coating weight of approximately (25+/−3) milligrams per square decimeter. A UV-visible spectrum of the sample was recorded; the absorbance at the wavelength 825 nanometers was 0.5817 absorbance units. The increase of 0.5751 absorbance units over Comparative Example 2 (approximately an 85-fold increase) was due to the infrared-absorbing dye. The sample was heated in air at 200 degrees Celsius in an oven for 60 minutes. After the sample cooled to room temperature, a UV-visible spectrum of the sample was recorded; the absorbance at the wavelength 825 nanometers was 0.1898 absorbance units. The decrease of 0.3919 absorbance units versus the same sample before heating was due to thermal decolorization of the infrared-absorbing dye. At least 65% of the infrared-absorbing dye was thermally decolorized to materials with lower characteristic absorbance at 825 nanometers.

The red composition was suitable for thermal imaging using an 830 nanometer infrared laser as in commercially available thermal imagers such as the Creo 3244 Spectrum Trendsetter® thermal imaging device (manufactured by Creo, Vancouver, BC), to manufacture objects such as multicolor proofs and color filters using known techniques.

Example 5

Example 5 illustrates the thermal decolorization of infrared-absorbing dye in a thermal imaging red formulation by heating the red formulation.

A red composition was made by combining 0.026 parts SDA-5802 infrared-absorbing dye, 1.465 parts 32R238D, 0.419 parts 32Y145D, 2.118 parts latex PR-1 (pH 8.5), 0.030 parts Zonyl® FSA fluorosurfactant, and 5.943 parts water to obtain a 15% solids composition. The composition was coated on a 50 millimeter by 75 millimeter glass slide using a number 6 wire wound rod and dried in an oven at 50 degrees Celsius for 15 minutes to obtain a sample with dry coating weight of (20+/−2) milligrams per square decimeter. A UV-visible spectrum of the sample was recorded; the absorbance at the wavelength 825 nanometers was 0.4012 absorbance units. The increase of 0.3946 absorbance units over Comparative Example 2 (approximately a 50-fold increase) was due to the infrared-absorbing dye. The sample was heated in air at 200 degrees Celsius in an oven for 60 minutes. After the sample cooled to room temperature, a UV-visible spectrum of the sample was recorded; the absorbance at the wavelength 825 nanometers was 0.0400 absorbance units. The decrease of 0.3672 absorbance units versus the same sample before heating was due to thermal decolorization of the infrared-absorbing dye. At least 91% of the infrared-absorbing dye thermally decolorized to materials with lower characteristic absorbance at 825 nanometers.

The red composition was suitable for thermal imaging using an 830 nanometer infrared laser as in commercially available thermal imagers such as the Creo 3244 Spectrum Trendsetter® thermal imaging device (manufactured by Creo, Vancouver, BC), to manufacture objects such as multicolor proofs and color filters using known techniques.

Example 6

Example 6 illustrates that thermal decomposition of the infrared-absorbing dye can lead to a color closer to white. The example comprises a pigment-free formulation so that absorbances otherwise obscured by pigment can be studied.

A composition was made by combining 0.026 parts SDA-4927 infrared-absorbing dye, 4.40 parts latex PR-10, 0.030 parts Zonyl® FSA fluorosurfactant, and 5.544 parts water to obtain a 15% solids composition. The composition was coated on a 50 millimeter by 75 millimeter glass slide using a number 6 wire wound rod and dried in an oven at 50 degrees Celsius for 15 minutes to obtain a sample with dry coating weight of (8+/−1) milligrams per square decimeter. A UV-visible spectrum of the sample was recorded; the absorbance at the wavelength 825 nanometers was 0.2588 absorbance units. The sample was heated in air at 200 degrees Celsius in an oven for 30 minutes. After the sample cooled to room temperature, a UV-visible spectrum of the sample was recorded; the absorbance at the wavelength 825 nanometers was 0.0119 absorbance units. The decrease of 0.2496 absorbance units versus the same sample before heating was due to thermal decolorization of the infrared-absorbing dye. At least 95% of the infrared-absorbing dye was thermally decolorized to materials with lower characteristic absorbance at 825 nanometers. Identically prepared samples were similarly analyzed by UV-visible spectroscopy at various times, namely after drying yet before being heated above 50 degrees Celsius, and later after being heated for other combinations of temperature and time at that temperature as shown below, with the indicated results on absorbance at the given wavelengths indicative of the infrared-absorbing dye and related decomposition products:

TABLE 2

Useful Thermal decolorization of Infrared-absorbing dye by Heating

| Wavelength | Absorbance after Heating at 200 degrees Celsius (after drying) | | |
|---|---|---|---|
| (nanometers) | 0 minutes | 15 minutes | 30 minutes |
| 450 nm | 0.0182 | 0.0221 | 0.0174 |
| 550 nm | 0.0070 | 0.0232 | 0.0140 |
| 650 nm | 0.0241 | 0.0043 | 0.0028 |
| 750 nm | 0.2354 | 0.0104 | 0.0050 |
| 850 nm | 0.2468 | 0.0190 | 0.0082 |

TABLE 3

Useful Thermal Decolorization of Infrared-absorbing dye by Heating

| Wavelength | Absorbance after Heating at 180 degrees Celsius (after drying) | | |
|---|---|---|---|
| (nanometers) | 0 minutes | 30 minutes | 90 minutes |
| 450 nm | 0.0213 | 0.0261 | 0.0180 |
| 550 nm | 0.0090 | 0.0282 | 0.0136 |
| 650 nm | 0.0291 | 0.0054 | 0.0028 |
| 750 nm | 0.2856 | 0.0190 | 0.0072 |
| 850 nm | 0.2982 | 0.0335 | 0.0105 |

TABLE 4

Useful Thermal Decolorization of Infrared-absorbing dye by Heating

| Wavelength | Absorbance after Heating at 160 degrees Celsius (after drying) | | | |
|---|---|---|---|---|
| (nanometers) | 0 minutes | 60 minutes | 180 minutes | 300 minutes |
| 450 nm | 0.0256 | 0.0317 | 0.0237 | 0.0185 |
| 550 nm | 0.0102 | 0.0423 | 0.0217 | 0.0140 |
| 650 nm | 0.0354 | 0.0086 | 0.0038 | 0.0020 |
| 750 nm | 0.3455 | 0.0483 | 0.0137 | 0.0081 |
| 850 nm | 0.3569 | 0.1010 | 0.0294 | 0.0160 |

The color measurement of Example 6 transferred material before heating showed a* equal to −0.87 and b* equal to 1.53, corresponding to a spectral difference from white of 1.76 delta a*b*. The color measurement, after heating at 200 degrees Celsius for 60 minutes in air, showed a* equal to 0.87, and b* equal to 0.79, corresponding to a smaller spectral difference from white of 1.17 delta a*b*. These data show that the thermal decolorization of this infrared-absorbing dye did not lead to an objectional color change. The changed color is closer to white.

Example 7

Example 7 illustrates that thermal decomposition of the infrared-absorbing dye can lead to a color closer to white. The example comprises a pigment-free formulation so that absorbances otherwise obscured by pigment can be studied.

A composition was made by combining 0.0258 parts IR-125 infrared-absorbing dye, 4.40 parts latex PR-10, 0.03 parts Zonyl® FSA fluorosurfactant, and 5.54 parts water to obtain a 15% solids composition. The composition was coated on a 50 millimeter by 75 millimeter glass slide using a number 6 wire wound rod and dried in an oven at 50 degrees Celsius for 15 minutes to obtain a sample with dry coating weight of approximately (9+/−1) milligrams per square decimeter. A UV-visible spectrum of the sample was recorded; the absorbance at the wavelength 825 nanometers was 0.1972 absorbance units. The sample was heated in air at 200 degrees Celsius in an oven for 60 minutes. After the sample cooled to room temperature, a UV-visible spectrum of the sample was recorded; the absorbance at the wavelength 825 nanometers was 0.0035 absorbance units. The decrease of 0.1937 absorbance units versus the same sample before heating was due to thermal decolorization of the infrared-absorbing dye. At least 98% of the infrared-absorbing dye was thermally decolorized to materials with lower characteristic absorbance at 825 nanometers. Identically prepared samples were similarly analyzed by UV-visible spectroscopy at various times, namely after drying yet before being heated above 50 degrees Celsius, and later after being heated for other combinations of temperature and time at that temperature as shown below, with the indicated results on absorbance at the given wavelengths indicative of the infrared-absorbing dye and related decomposition products:

TABLE 5

Useful Thermal decolorization of Infrared-absorbing dye by Heating

| Wavelength | Absorbance after Heating at 160 degrees Celsius (after drying) | | | |
|---|---|---|---|---|
| (nanometers) | 0 minutes | 30 minutes | 90 minutes | 150 minutes |
| 450 nm | 0.0192 | 0.0219 | 0.0221 | 0.0207 |
| 550 nm | 0.0077 | 0.0119 | 0.0147 | 0.0145 |
| 650 nm | 0.0722 | 0.0697 | 0.0278 | 0.0183 |
| 750 nm | 0.2541 | 0.1588 | 0.0827 | 0.0495 |
| 850 nm | 0.1193 | 0.0903 | 0.0547 | 0.0347 |

TABLE 6

Useful Thermal Decolorization of Infrared-absorbing dye by Heating

| Wavelength | Absorbance after Heating at 180 degrees Celsius (after drying) | | | |
|---|---|---|---|---|
| (nanometers) | 0 minutes | 15 minutes | 105 minutes | 165 minutes |
| 450 nm | 0.0262 | 0.0290 | 0.0234 | 0.0216 |
| 550 nm | 0.0106 | 0.0196 | 0.0188 | 0.0165 |
| 650 nm | 0.1057 | 0.0799 | 0.0168 | 0.0127 |
| 750 nm | 0.3372 | 0.1893 | 0.0203 | 0.0127 |
| 850 nm | 0.1635 | 0.1127 | 0.0163 | 0.0096 |

TABLE 7

Useful Thermal Decolorization of Infrared-absorbing dye by Heating

| Wavelength | Absorbance after Heating at 200 degrees Celsius (after drying) | | | |
|---|---|---|---|---|
| (nanometers) | 0 minutes | 15 minutes | 30 minutes | 60 minutes |
| 450 nm | 0.0163 | 0.0180 | 0.0164 | 0.0143 |
| 550 nm | 0.0085 | 0.0151 | 0.0128 | 0.0105 |
| 650 nm | 0.0612 | 0.0153 | 0.0108 | 0.0073 |
| 750 nm | 0.2067 | 0.0220 | 0.0098 | 0.0037 |
| 850 nm | 0.0975 | 0.0196 | 0.0076 | 0.0020 |

The color measurement of Example 7 transferred material before heating showed a* equal to −2.76 and b* equal to 0.62, corresponding to a spectral difference from white of 2.83 delta a*b*. The color measurement, after heating at 200 degrees Celsius for 60 minutes in air, showed a* equal to 0.00, and b* equal to 0.62, corresponding to a smaller spectral difference from white of 0.62 delta a*b*.

Example 8

Example 8 illustrates that thermal decomposition of the infrared-absorbing dye can lead to a color closer to white. The example comprises a pigment-free formulation so that absorbances otherwise obscured by pigment can be studied. Liquids other than water (for example, acetone) can be used as the major carrier of a formulation.

A composition was made by combining 0.0255 parts TIC-5C infrared-absorbing dye, 1.475 parts dried latex PR-11, 0.030 parts Zonyl® FSA fluorosurfactant, and 8.50 parts acetone to obtain a 15% solids composition. The composition was coated on a 50 millimeter by 75 millimeter glass slide using a number 6 wire wound rod and dried in an oven at 50 degrees Celsius for 15 minutes to obtain a sample with dry coating weight of approximately (10+/−1) milligrams per square decimeter. A UV-visible spectrum of the sample was recorded; the absorbance at the wavelength 825 nanometers was 0.4698 absorbance units. The sample was heated in air at 200 degrees Celsius in an oven for 60 minutes. After the sample cooled to room temperature, a UV-visible spectrum of the sample was recorded; the absorbance at the wavelength 825 nanometers was 0.0000 absorbance units. The decrease of 0.4698 absorbance units versus the same sample before heating was due to thermal decolorization of the infrared-absorbing dye. All of the infrared-absorbing dye was thermally decolorized to materials with lower characteristic absorbance at 825 nanometers. Identically prepared samples were similarly analyzed by UV-visible spectroscopy at various times, namely after drying yet before being heated above 50 degrees Celsius, and later after being heated for other combinations of temperature and time at that temperature as shown below, with the indicated results on absorbance at the given wavelengths indicative of the infrared-absorbing dye and related decomposition products:

TABLE 8

Useful Thermal decolorization of Infrared-absorbing dye by Heating

| Wavelength | Absorbance after Heating at 140 degrees Celsius (after drying) | | | |
|---|---|---|---|---|
| (nanometers) | 0 minutes | 60 minutes | 180 minutes | 360 minutes |
| 450 nm | 0.0226 | 0.0517 | 0.0455 | 0.0218 |
| 550 nm | 0.0065 | 0.1313 | 0.0572 | 0.0138 |
| 650 nm | 0.0694 | 0.0107 | 0.0094 | 0.0070 |
| 750 nm | 0.3016 | 0.0104 | 0.0020 | −0.0004 |
| 850 nm | 0.1494 | 0.0056 | 0.0011 | 0.0001 |

TABLE 9

Useful Thermal Decolorization of Infrared-absorbing dye by Heating

| Wavelength | Absorbance after Heating at 180 degrees Celsius (after drying) | | | |
|---|---|---|---|---|
| (nanometers) | 0 minutes | 15 minutes | 45 minutes | 90 minutes |
| 450 nm | 0.0239 | 0.0499 | 0.0389 | 0.0289 |
| 550 nm | 0.0053 | 0.1059 | 0.0486 | 0.0238 |
| 650 nm | 0.0644 | 0.0072 | 0.0063 | 0.0062 |
| 750 nm | 0.2856 | 0.0043 | 0.0016 | 0.0016 |
| 850 nm | 0.1380 | 0.0006 | −0.0020 | −0.0012 |

TABLE 10

Useful Thermal Decolorization of Infrared-absorbing dye by Heating

| Wavelength | Absorbance after Heating at 100 degrees Celsius (after drying) | | | | | | | |
|---|---|---|---|---|---|---|---|---|
| (nanometers) | 0 mins | 60 mins | 120 mins | 180 mins | 240 mins | 300 mins | 360 mins | 420 mins |
| 450 nm | 0.0243 | 0.0276 | 0.0292 | 0.0311 | 0.0307 | 0.0285 | 0.0263 | 0.0233 |
| 550 nm | 0.0070 | 0.0202 | 0.0269 | 0.0277 | 0.0237 | 0.0189 | 0.0157 | 0.0135 |
| 650 nm | 0.0489 | 0.0434 | 0.0404 | 0.0373 | 0.0324 | 0.0279 | 0.0239 | 0.0202 |
| 750 nm | 0.2146 | 0.1719 | 0.1521 | 0.1317 | 0.1086 | 0.0895 | 0.0748 | 0.0640 |
| 850 nm | 0.1013 | 0.0763 | 0.0631 | 0.0493 | 0.0390 | 0.0289 | 0.0215 | 0.0181 |

The color measurement of Example 8 transferred material before heating showed a* equal to −3.38 and b* equal to 0.82, corresponding to a spectral difference from white of 3.48 delta a*b*. The color measurement, after heating at 200 degrees Celsius for 60 minutes in air, showed a* equal to 0.95, and b* equal to 1.24, corresponding to a smaller spectral difference from white of 1.56 delta a*b*.

Example 9

Example 9 illustrates that thermal decomposition of the infrared-absorbing dye can lead to a color closer to white. The example comprises a pigment-free formulation so that absorbances otherwise obscured by pigment can be studied.

A composition was made by combining 0.026 parts SDA-5802 infrared-absorbing dye, 4.40 parts latex PR-10, 0.030 parts Zonyl® FSA fluorosurfactant, and 5.54 parts water to obtain a 15% solids composition. The composition was coated on a 50 millimeter by 75 millimeter glass slide using a number 6 wire wound rod and dried in an oven at 50 degrees Celsius for 15 minutes to obtain a sample with dry coating weight of approximately (11+/−1) milligrams per square decimeter. A UV-visible spectrum of the sample was recorded; the absorbance at the wavelength 825 nanometers was 0.2534 absorbance units. The sample was heated in air at 200 degrees Celsius in an oven for 120 minutes. After the sample cooled to room temperature, a UV-visible spectrum of the sample was recorded; the absorbance at the wavelength 825 nanometers was 0.0013 absorbance units. The decrease of 0.2521 absorbance units versus the same sample before heating was due to thermal decolorization of the infrared-absorbing dye. At least 99% of the infrared-absorbing dye was thermally decolorized to materials with lower characteristic absorbance at 825 nanometers. Identically prepared samples were similarly analyzed by UV-visible spectroscopy at various times, namely after drying yet before being heated above 50 degrees Celsius, and later after being heated for other combinations of temperature and time at that temperature as shown below, with the indicated results on absorbance at the given wavelengths indicative of the infrared-absorbing dye and related decomposition products:

TABLE 11

Useful Thermal Decolorization of Infrared-absorbing dye by Heating Thermal decolorization

| Wavelength | Absorbance after Heating at 160 degrees Celsius (after drying) | | | |
|---|---|---|---|---|
| (nanometers) | 0 minutes | 30 minutes | 90 minutes | 150 minutes |
| 450 nm | 0.0167 | 0.0320 | 0.0328 | 0.0304 |
| 550 nm | 0.0048 | 0.0391 | 0.0381 | 0.0338 |
| 650 nm | 0.0327 | 0.0401 | 0.0247 | 0.0197 |
| 750 nm | 0.2343 | 0.0648 | 0.0264 | 0.0164 |
| 850 nm | 0.3303 | 0.1179 | 0.0408 | 0.0206 |

TABLE 12

Useful Thermal Decolorization of Infrared-absorbing dye by Heating

| Wavelength | Absorbance after Heating at 180 degrees Celsius (after drying) | | | |
|---|---|---|---|---|
| (nanometers) | 0 minutes | 15 minutes | 105 minutes | 165 minutes |
| 450 nm | 0.0160 | 0.0341 | 0.0257 | 0.0231 |
| 550 nm | 0.0051 | 0.0456 | 0.0282 | 0.0236 |
| 650 nm | 0.0324 | 0.0292 | 0.0121 | 0.0092 |
| 750 nm | 0.2320 | 0.0453 | 0.0072 | 0.0042 |
| 850 nm | 0.3296 | 0.0827 | 0.0040 | −0.0001 |

TABLE 13

Useful Thermal Decolorization of Infrared-absorbing dye by Heating

| Wavelength | Absorbance after Heating at 200 degrees Celsius (after drying) | | | |
|---|---|---|---|---|
| (nanometers) | 0 minutes | 15 minutes | 30 minutes | 120 minutes |
| 450 nm | 0.0150 | 0.0313 | 0.0278 | 0.0192 |
| 550 nm | 0.0038 | 0.0374 | 0.0307 | 0.0185 |
| 650 nm | 0.0296 | 0.0166 | 0.0130 | 0.0071 |
| 750 nm | 0.2039 | 0.0140 | 0.0068 | 0.0009 |
| 850 nm | 0.2903 | 0.0224 | 0.0081 | 0.0003 |

The color measurement of Example 9 transferred material before heating showed a* equal to −1.24 and b* equal to 1.06, corresponding to a spectral difference from white of 1.63 delta a*b*. The color measurement, after heating at 200 degrees Celsius for 60 minutes in air, showed a* equal to 1.11, and b* equal to 0.63, corresponding to a smaller spectral difference from white of 1.28 delta a*b*.

Example 10

Example 10 illustrates that thermal decolorization of infrared-absorbing dye is not dependent on the presence of air at one atmosphere of pressure. The example comprises a pigment-free formulation so that absorbances otherwise obscured by pigment can be studied.

A composition was made by combining 0.026 parts SDA-4927 infrared-absorbing dye, 4.40 parts latex PR-10, 0.030 parts Zonyl® FSA fluorosurfactant, and 5.54 parts water to obtain a 15% solids composition. The composition was coated on a 50 millimeter by 75 millimeter glass slide using a number 6 wire wound rod and dried in an oven at 50 degrees Celsius for 15 minutes to obtain a sample with dry coating weight of approximately (10+/−1) milligrams per square decimeter. A UV-visible spectrum of the sample was recorded. The sample was heated in air at 195 degrees Celsius in a vacuum oven at a reduced pressure of 50 kilopascals for 60 minutes. The sample was removed from the oven, cooled to room temperature, and a UV-visible spectrum of the sample was recorded. At least 99% of the infrared-absorbing dye was thermally decolorized to materials with lower characteristic absorbance at 825 nanometers.

TABLE 14

Useful Thermal decolorization of
Infrared-absorbing dye by Heating

| Wavelength | Absorbance after Heating at 195 degrees Celsius (after drying) | |
| --- | --- | --- |
| (nanometers) | 0 minutes | 60 minutes |
| 450 nm | 0.022134 | 0.01754 |
| 550 nm | 0.009839 | 0.01712 |
| 650 nm | 0.031646 | 0.003919 |
| 750 nm | 0.310251 | 0.004089 |
| 850 nm | 0.354832 | 0.009677 |

The description of illustrative embodiments and best modes of the present invention is not intended to limit the scope of the invention. Various modifications, alternative constructions and equivalents may be employed without departing from the true spirit and scope of the appended claims.

What is claimed is:

1. A method for making a radiation filter element, comprising the steps of:

exposing part of an assemblage to infrared radiation, the assemblage comprising a donor comprising (1) a support capable of transmitting infrared light, and (2) a transferable layer comprising a transferable material and an infrared-absorbing dye, the transferable layer of the donor being in contact with a receiver to provide an exposed assemblage comprising an exposed part of the transferable layer and an unexposed part of the transferable layer;

separating the receiver and the support of the exposed assemblage to obtain an imaged receiver and a spent donor, wherein the imaged receiver comprises the receiver, a transferred portion of the transferable material and a transferred portion of the infrared-absorbing dye, said transferred portion of the IR dye having a color and the spent donor comprises the support and a retained portion of the transferable layer;

heating the transferred portion of the transferable material and the transferred portion of the infrared-absorbing dye at a temperature ranging from about 100 degrees Celsius to about 350 degrees Celsius for a period of time sufficient to thermally decolorize 50% to 100% of the transferred portion of the infrared-absorbing dye, the heating being in the absence of a thermal bleaching agent to provide a radiation filter element suitable for use in a liquid crystal display.

2. The method of claim 1 in which the infrared-absorbing dye is selected from the group consisting of
(a) 2-(2-(2-chloro-3-(2-(1,3-dihydro-1,1-dimethyl-3-(4-sulfobutyl)-2H-benz[e]indol-2-ylidene)ethylidene)-1-cyclohexene-1-yl)ethenyl)-1,1-dimethyl-3-(4-sulfobutyl)-1H-benz[e]indolium, inner salt, free acid,
(b) 2-[2-[2-(2-pyrimidinothio)-3-[2-(1,3-dihydro-1,1-dimethyl-3-(4-sulfobutyl)-2H-benz[e]indol-2-ylidene)]ethylidene-1-cyclopenten-1-yl]ethenyl]-1,1dimethyl-3-(4-sulfobutyl)-1H-benz[e]indolium, inner salt, sodium salt,
(c) indocyanine green, and
(d) 3H-indolium, 2-[2-[2-chloro-3-[(1,3-dihydro-1,3,3-trimethyl-2H-indol-2-ylidene)ethylidene]-1-cyclopenten-1-yl]ethenyl]- 1,3,3-trimethyl-, salt with trifluoromethanesulfonic acid (1:1).

3. A method for making a monochrome or color filter element suitable for use in a liquid crystal display device, comprising the steps of:

heating an assemblage comprising
a donor comprising (1) a support, and (2) a transferable layer comprising a transferable material and an infrared-absorbing dye, the transferable layer being in contact with a receiver;

exposing part of the assemblage to infrared radiation directed at the transferable layer to provide an exposed assemblage comprising an exposed part of the transferable layer and an unexposed part of the transferable layer;

separating the receiver and the support of the exposed assemblage to obtain an imaged receiver and a spent donor, wherein the imaged receiver comprises the receiver, a portion of the transferable material, and a portion of the infrared-absorbing dye; and the spent donor comprises the support and retained transferable layer comprising the transferable material;

heating the portion of the infrared-absorbing dye, at about 100 degrees Celsius to about 350 degrees Celsius for a period of time sufficient to thermally decolorize 50% to 100% of the portion of the infrared-absorbing dye in the absence of added bleaching agent, to provide a color filter element comprising a thermally decolorized material, the color filter element being;

suitable for a liquid crystal display.

4. The method of claim 3 wherein the infrared-absorbing dye is selected from the group consisting of
(a) 2-(2-(2-chloro-3-(2-(1,3-dihydro-1,1-dimethyl-3-(4-sulfobutyl)-2H-benz[e]indol-2-ylidene)ethylidene)-1-cyclohexene-1-yl)ethenyl)-1,1-dimethyl-3-(4-sulfobutyl)-1H-benz[e]indolium, inner salt, free acid,
(b) 2-[2-[2-(2-pyrimidinothio)-3-[2-(1,3-dihydro-1,1-dimethyl-3-(4-sulfobutyl)-2H-benz[e]indol-2-ylidene)]ethylidene-1-cyclopenten-1-yl]ethenyl]-1,1dimethyl-3-(4-sulfobutyl)-1H-benz[e]indolium, inner salt, sodium salt,
(c) indocyanine green, and
(d) 3H-indolium, 2-[2-[2-chloro-3-[(1,3-dihydro-1,3,3-trimethyl-2H-indol-2-ylidene)ethylidene]-1-cyclopenten-1-yl]ethenyl]- 1,3,3-trimethyl-, salt with trifluoromethanesulfonic acid (1:1).

5. A radiation filter element made by the process of claim 1 or 3.

6. A liquid crystal display device comprising a radiation filter element made by the process of claim 1 or 3 associated with an electrically conductive coating, a liquid crystal material and an alignment layer.

* * * * *